(12) United States Patent
Marsh et al.

(10) Patent No.: US 9,817,978 B2
(45) Date of Patent: Nov. 14, 2017

(54) SYSTEMS AND METHODS FOR IMPLEMENTING MODULAR COMPUTER SYSTEM SECURITY SOLUTIONS

(71) Applicant: Ark Network Security Solutions, LLC, Dulles, VA (US)

(72) Inventors: Jacob J. Marsh, Centreville, VA (US); Gregory D. Roney, Chantilly, VA (US)

(73) Assignee: Ark Network Security Solutions, LLC, Dulles, VA (US)

( * ) Notice: Subject to any disclaimer, the term of this patent is extended or adjusted under 35 U.S.C. 154(b) by 72 days.

(21) Appl. No.: 14/511,866

(22) Filed: Oct. 10, 2014

(65) Prior Publication Data

US 2015/0106873 A1    Apr. 16, 2015

Related U.S. Application Data

(60) Provisional application No. 61/889,610, filed on Oct. 11, 2013, provisional application No. 62/048,553, filed on Sep. 10, 2014.

(51) Int. Cl.
*G06F 21/64* (2013.01)
*G06F 21/57* (2013.01)
*G06Q 10/06* (2012.01)

(52) U.S. Cl.
CPC ....... *G06F 21/577* (2013.01); *G06Q 10/0635* (2013.01)

(58) Field of Classification Search
None
See application file for complete search history.

(56) References Cited

U.S. PATENT DOCUMENTS 6,901,346 B2   5/2005   Tracy et al.
6,983,221 B2   1/2006   Tracy et al.
(Continued)

FOREIGN PATENT DOCUMENTS

EP    2 199 942 A2    6/2010

OTHER PUBLICATIONS

"Guide for Assessing the Security Controls in Federal Information Systems and Organizations," NIST Special Publication 800-53A, Revision 1, National Institute of Standards and Technology, U.S. Department of Commerce, Jun. 2010 (399 pgs.).
(Continued)

*Primary Examiner* — Dede Zecher
*Assistant Examiner* — Richard A McCoy
(74) *Attorney, Agent, or Firm* — Cooley LLP

(57) ABSTRACT

In some embodiments, an apparatus includes a control chain generation module is configured to receive, from a control database, a security guideline control to be implemented with respect to a hardware asset. The control chain generation module is configured to select, based on requirements to satisfy the security guideline and attributes of the hardware asset, a security implementation control. The control chain generation module is configured to select a control assessor to monitor the compliance of the hardware asset with the security guideline and is configured to define a control chain including the security guideline control, the security implementation control, and the control assessor. The control chain generation module is configured to send an instruction to apply the control chain to the hardware asset such that the control assessor monitors the hardware asset for compliance with the security guideline.

24 Claims, 14 Drawing Sheets

(56) References Cited

U.S. PATENT DOCUMENTS

| | | |
|---|---|---|
| 6,993,448 B2 | 1/2006 | Tracy et al. |
| 7,380,270 B2 | 5/2008 | Tracy et al. |
| 8,166,551 B2 | 4/2012 | King |
| 2005/0132225 A1 | 6/2005 | Gearhart |
| 2006/0005246 A1 | 1/2006 | Dalton |
| 2006/0075503 A1* | 4/2006 | Bunker ............ G06F 11/324 726/25 |
| 2006/0107319 A1 | 5/2006 | Smiley |
| 2006/0178954 A1* | 8/2006 | Thukral ............ G06Q 10/087 705/28 |
| 2007/0061125 A1 | 3/2007 | Bhatt et al. |
| 2008/0028470 A1* | 1/2008 | Remington ........ G06F 21/33 726/25 |
| 2008/0091441 A1 | 4/2008 | Flammer et al. |
| 2008/0162496 A1* | 7/2008 | Postrel ............ G06Q 10/10 |
| 2008/0282320 A1 | 11/2008 | Denovo et al. |
| 2009/0113350 A1 | 4/2009 | Hibino et al. |
| 2009/0144095 A1 | 6/2009 | Shahi et al. |
| 2009/0144836 A1* | 6/2009 | Gutta ................ G06F 21/10 726/30 |
| 2009/0307763 A1* | 12/2009 | Rawlins ............ G06F 9/44505 726/5 |
| 2010/0058114 A1 | 3/2010 | Perkins et al. |
| 2010/0095381 A1 | 4/2010 | Levi |
| 2010/0154027 A1 | 6/2010 | Sobel et al. |
| 2010/0218256 A1 | 8/2010 | Thomas et al. |
| 2010/0325412 A1 | 12/2010 | Norrman et al. |
| 2011/0213722 A1 | 9/2011 | Carson et al. |
| 2011/0264560 A1* | 10/2011 | Griffiths ............ G06Q 10/06 705/27.1 |
| 2012/0084867 A1 | 4/2012 | Baggett, Jr. et al. |
| 2013/0218588 A1* | 8/2013 | Kehr ................ A61B 5/4839 705/2 |

OTHER PUBLICATIONS

International Search Report/Written Opinion dated Jan. 23, 2015 for PCT Application PCT/US2014/060102.

Extended European Search Report dated May 26, 2017 for EP Application No. 14851542.0.

* cited by examiner

SYSTEMS AND METHODS FOR IMPLEMENTING MODULAR COMPUTER SYSTEM SECURITY SOLUTIONS

CROSS-REFERENCE TO RELATED APPLICATIONS

This application claims priority to and the benefit of U.S. Provisional Patent Application No. 61/889,610, filed Oct. 11, 2013 and titled "Dynamic Certification and Accreditation System," and U.S. Provisional Patent Application No. 62/048,553, filed Sep. 10, 2014 and titled "Systems and Methods for a Dynamic Certification and Accreditation System," each of which is incorporated herein by reference in its entirety.

BACKGROUND

One or more embodiments described herein relate generally to security systems, and more particularly, to asset risk mitigation, protection, regulatory compliance and systems and methods for the same.

Known information systems routinely undergo a Certification and Accreditation process (e.g., a C&A process) or other risk mitigation, protection, best practice or regulatory compliance process to protect data, machines, and/or similar assets from security holes and leaks. Users ushering information systems through a C&A and Assessment and Authorization (e.g., A&A) typically process select security controls, which can be safeguards and countermeasures established by industry standards groups and committees, based on the category and impact level of an information system according to security objectives such as confidentiality, integrity and availability. The security controls are then implemented into the information system to increase or maximize the security of the information system while balancing its functionality and other concerns such as budget and schedule.

Security systems can use security guidelines to develop security solutions for a user's assets. Users can choose and/or develop solutions based on their analysis of security guidelines, and can determine which solutions are appropriate for their systems. Users can evaluate the effectiveness of their selected solutions to determine whether the solutions should be modified and/or replaced with other security solutions. Such a process can be time-consuming and overwhelming for a user with little security experience, or a user with a wide variety of assets.

Accordingly, a need exists for systems and methods that can automate and/or simplify the C&A process as well as any process that involves the planning and protection of assets through risk mitigation and best practice application and regulatory compliance.

SUMMARY

In some embodiments, an apparatus includes a control chain generation module is configured to receive, from a control database, a security guideline control to be implemented with respect to a hardware asset. The control chain generation module is configured to select, based on requirements to satisfy the security guideline and attributes of the hardware asset, a security implementation control. The control chain generation module is configured to select a control assessor to monitor the compliance of the hardware asset with the security guideline and is configured to define a control chain including the security guideline control, the security implementation control, and the control assessor. The control chain generation module is configured to send an instruction to apply the control chain to the hardware asset such that the control assessor monitors the hardware asset for compliance with the security guideline.

DETAILED DESCRIPTION

In some implementations, a user (e.g., an individual, a business, an organization, and/or a similar asset owner) can have an information system (e.g., a discrete set of information resources organized for the collection, storage, processing, maintenance, use, sharing, dissemination, or disposition of information) that can include assets (e.g., data assets, individual and/or organization assets, infrastructure assets, property assets, agency assets, information system assets, connections between assets, and/or the like) that the user would like to protect using best-practice security standards and/or solutions. The user can use the systems and methods described herein to monitor and update Control Implementations for the assets. In some implementations, updates to the system can be distributed automatically and/or manually across user-specified and/or selected Control Implementations, based on user preferences. The user can utilize a user interface (e.g., a network application which can communicate with the user and network devices, e.g., via the internet, an internal application, which may interact with devices within a business or organization, and/or a similar interface), which can allow either modification and/or selection of Control Guidelines, Control Implementation, and/or Control Assessor mechanisms, or can allow the user to view the health and/or risk assessment of a particular Control Implementation the user has chosen to implement, and/or the like.

Figure 1:
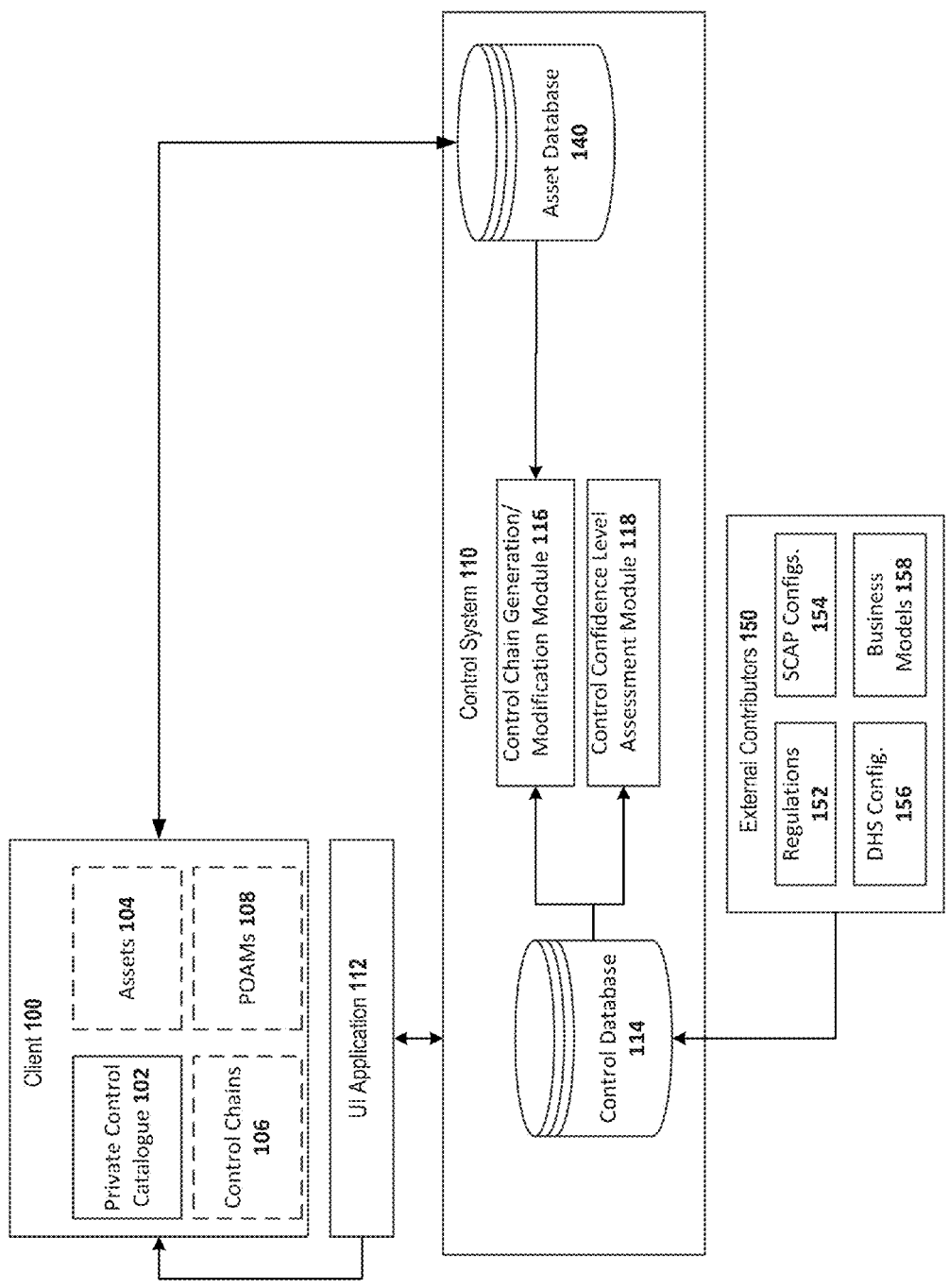
FIG. 1 is a schematic illustration of a client system, a control system, and external contributor systems, according to an embodiment.

For example, in some implementations the user can view the health and/or similar attributes of Control Implementations using an interface for the Security Control Health Engine (SCHE) (e.g., a Control Confidence Level Assessment Module as described in FIG. 1) that conducts automatic assessment for user information systems and/or other assets. The SCHE interface of the system can be set to passive mode, in which it can prevent outgoing communications and listen to incoming communication on the interface. The SCHE interface can also be set to active mode in which it can use different communications protocols such as, but not limited to, SNMPv1, SNMPv2c, and SNMPv3 to communicate to a wide variety of substantially continuous monitoring Control Implementations to gather substantially real-time status of an information system and/or monitored assets.

In some implementations a user interface can also provide an interactive question and answer guide that asks both general and specific questions based on industry standards and organizationally defined parameters that assist users of various experience levels through the establishment of an information system security solution and its related categorization under, but not limited to, such guidelines as Federal Information Processing Standards (FIPS) Publication 199 and Committee on National Security Systems Instruction (CNSSI) No. 1253. The user can be provided with, but not limited to, text boxes, drop-down menus, radio buttons and check boxes along with guidance and direction for the requested input. The control system (as described in FIG. 1) stores the input in data elements within a database that can maintain one to many relationships between the data input by the user. This allows the input information to be associated with other details and information that is gathered throughout the system's execution of the C&A or A&A process (or other risk mitigation, protection, best practice or regulatory compliance processes) along with, but not limited to, information system Plans of Actions and Milestones (e.g., POAMs), security control health, and information system risk scores. Such details and information can be combined together to define both the traditional artifacts of the C&A and A&A process such as System Security Plans, Risk Assessment Reports, Security Assessment Reports, and/or the like, as well as custom generated reports based on the selected data elements. The information system and/or other assets can be automatically categorized based on the input of the user and according to industry standards and organizationally defined parameters in any suitable industry such as, for example, medical, financial, critical infrastructures, cybersecurity, insurance, private industry and/or the like.

The control system can also include an asset inventory that allows users to input representations of their attributes into the system in a modular fashion to facilitate pre-approval of attributes that can be combined into dynamic assets, and can allow the user's information system and its collection of assets to expand and contract its boundaries without compromising its security. For example, the user can pre-define expected attributes and/or characteristics of assets that can be added to an information system, and can pre-approve characteristic attributes for the assets (e.g., pre-define expected attributes and/or attribute values) such that when a pre-defined asset is dynamically added to the information system, the system can automatically review the dynamically-added asset to verify that it includes the expected attributes and/or characteristics, that the expected attributes and/or characteristics have expected values and/or value types, and that it complies with defined security industry standard and organizational guidelines.

In some embodiments, the asset inventory can separate assets into three different attributes: Attribute Types, Attribute Values, and Attribute Groups. This level of modularity can be provided so users can mix and match, and even group, which attributes define the assets in a user's information system. An Attribute Type can represent the type of attribute the user is defining, such as an Internet Protocol (IP) address or serial number of a component. The user can add her own attribute types not already stored in the system. An Attribute Value can be the actual value of a component attribute, e.g., 1.1.1.1 for an IP address Attribute Type. An Attribute Group can be a grouping of Attribute Values, such as a number of pre-defined IP addresses. The Attribute Values and the Attribute Groups can be linked together (e.g., using a flag and/or value in a database) to form an asset in the system's component inventory. Users can also group assets together using the user interface to show relationships between assets. Users can also set attributes (e.g., access and connection attributes) for an asset that link that asset with other assets.

The asset can be labeled as fixed (e.g., to indicate an asset that is static or permanently a part of an information system), or that the asset is transient (e.g., that the asset can be added and removed). This can allow Control Assessors for selected Control Implementations to gather assessment information for assets at the appropriate time and ensure that the pre-defined and pre-approved attributes match the asset that was dynamically added. Users can also import asset inventories into the system in recognized formats such as, but not limited to, comma separated files, XML and/or similar markup language files, and other popular formats that can automatically be parsed using pre-defined filters and separate the assets and their attributes into individual data elements. Asset inventories defined in the system can be exported to other systems. The asset inventory can be used for the automated Control Assessors, and can allow automatically mapping of suitable Control Implementations and Control Assessors to information systems based on the asset inventory and other characteristics of the information system. The system can also be used to discover a user's electronic assets, e.g., using a network connection, and can automatically populate the user space with the discovered assets and their respective attributes.

FIG. 1 is a schematic illustration of a client system 100, a control system 110, and external contributor systems 150, according to an embodiment. In some implementations, control system 110 can be an electronic computing system (e.g., a computing device and/or a set of computing devices, and/or the like) that can facilitate various portions of the C&A process. For example, control system 110 can facilitate collection of asset data, generation, collection, and/or sharing of Controls data, processing of asset and Controls data, assessment of Control efficacy and risk, and/or the like. In some implementations, the control system 110 can be a system run internally within a business or by an individual, and/or a similar entity, the control system 110 can be an external system (e.g., run by an external security organization and/or the like), or can be a distributed system, where some of the functionality of the control system 110 can be hosted within the client system 100, some of the control system 110 can be run internally within an organization using infrastructure separate from the client system 100, and some of the control system 110 can be run by an external entity on external infrastructure. The electronic computing system used to implement control system 110 can include a processor or set of processors operatively coupled to a memory or collection of memory modules. The memory or collection of memory modules can be configured to store instructions and/or code for the processor or set of processors to execute.

In some implementations, for example, the instructions and/or code can allow the processor to implement security solutions for a user's assets, analyze the effectiveness and risk associated with the implemented security solutions, determine ways of modifying the security solution to obtain an optimal and/or improved security solution, collect data to increase the available security solutions and the effectiveness of those solutions, and/or the like. The electronic computing system used to implement control system 110 can also include data storage modules for storing data relating to C&A process data (or other risk mitigation, protection, best practice or regulatory compliance process data), including but not limited to control data, asset data, and/or similar information. In some implementations such data storage modules can include databases (e.g., see at least FIGS. 2-3 for further details). Control system 110 can also use and/or host a user interface (UI) application 112 through which a user, via the client system 100, can interact with components of the control system 110. In some implementations, the UI application 112 can be hosted within the control system 110 and/or a similar control system to facilitate data transfer between the client machine 100 and external security control systems, and/or can be hosted within a business-internal server system to facilitate data transfer between the client machine 100 and an internal security control system configured to define and assess security controls.

The control system 110 can also include a control database 114, an asset database 140, a control chain generation and modification module 116 (sometimes referred to herein as a control chain generation module and/or a control chain modification module), and a control confidence level assessment module 118. In some implementations the control database 114 can store a variety of data about Security Controls (e.g., Controls, Control Catalogues, and/or the like), and can provide data to the control chain generation and modification module 116, and the control confidence level assessment module 118. The UI application 112 can further request data from the control database 114 to provide information to the user, e.g., Controls information, Control health information, and/or similar data (e.g., see FIG. 3 for further details). Asset database 140 can store data about a variety of user assets, and can provide asset data to the control chain generation and modification module 116, the control confidence level assessment module 118, and/or to the UI application 112, for example, when the user requests information about various assets and/or asset attributes (e.g., see FIG. 2 for further details).

The control chain generation and modification module 116 and the control confidence level assessment module 118 can receive data at least from the control database 114 and the asset database 140, and can use the data to calculate and/or provide data to the UI application 112 with which the client interacts. For example, the control chain generation and modification module 116 can receive data about the user's assets from the asset database 114 to select an optimal and/or applicable Guideline Control for a Control Chain for each of the assets, and can also search through the control database 114 to obtain optimal and/or applicable Implementation Controls and Assessor Controls to use for each Control Chain for each asset. The control chain generation and modification module 116 can then store this information in the control database 114, and provide the Control Chain data to the user's client system 100 for use at the client system.

The control confidence level assessment module 118 can receive Controls data from the control database 114 to assess the confidence level of security solutions for assets in the asset database 140 (e.g., to calculate a health evaluation and/or Risk Score for the Controls in a Control Chain for each of the assets). The control confidence level assessment module 118 can also provide and/or receive data from the UI application 112 (e.g., can provide the assessment data to the UI application 112 so the UI application 112 can display the data for a user, and/or can receive requests from the user to reevaluate the health of an asset's Control Chain via data sent from the UI application 112).

The client system 100 can be an electronic computing system (e.g., a computing device and/or the like) associated with a user, that can facilitate interaction between a user, the UI application 112, and the control system 110 (e.g., via an internet network connection, and/or the like). The electronic computing system used to implement the client system 100 can include a processor or set of processors operatively coupled to a memory or collection of memory modules. The memory or collection of memory modules can be configured to store instructions and/or code for the processor or set of processors to execute. In some implementations, for example, the instructions and/or code can allow the processor to implement security solutions for a user's assets, request Controls and/or asset data from control system 110, receive and forward user input (e.g., to the UI application 112), to store data relating to the user's assets, Control Chains, POAMs, and/or the like. The electronic computing system used to implement the client system 100 can also include data storage modules for storing data relating to C&A process data (or other risk mitigation, protection, best practice or regulatory compliance process data), including but not limited to Control Chain data, asset data, Private Control Catalogue data, POAM data, and/or similar information. In some implementations such data storage modules can include cloud storage, hard-disk storage, and/or the like.

The client system 100 can include at least a private Control Catalogue 102, which can store a private, user-selected collection of Controls (e.g., defined by and/or otherwise received from the control system 110). The client system 100 can also store asset data 104 (e.g., data pertaining to the user's particular assets, and/or the like), Control Chains 106 (e.g., Control Chains that the user has specified for her assets, and/or the like) and Plans of Action and Milestones (e.g., POAMs) 108 (e.g., that the user has specified for each of the Control Chains). The client system 100 can send and receive asset data to and from the asset database 140, and can allow a user to interact with the control system 110 via the UI application 112, which can obtain at least data relating to assets, Controls, and/or Control Chain health information from the control system 110. The client system 100 can also execute Control Chains, including but not limited to executing Implementation Controls, running Assessor Controls, and/or similar actions.

The external contributor systems 150 can each be electronic computing system (e.g., a computing device and/or the like) that can facilitate interaction between an external information source and the control system 110. The electronic computing system used to implement each of the external contributor systems 150 can include a processor or set of processors operatively coupled to a memory or collection of memory modules. The memory or collection of memory modules can be configured to store instructions and/or code for the processor or set of processors to execute. In some implementations, for example, the instructions and/or code can allow the processor or set of processors to receive data relating to C&A processes (or other risk mitigation, protection, best practice or regulatory compliance processes), and provide such data to the control database 114 to improve the performance of the control system 110. Each of the electronic computing system can also include data storage modules for storing data relating to C&A process data (or other risk mitigation, protection, best practice or regulatory compliance process data), including but not limited to regulations, business models, SCAP and/or DHS configurations, and/or similar information. In some implementations such data storage modules can include cloud storage, hard-disk storage, and/or the like.

In some implementations, external contributor systems 150 can connect with the control system 110 (e.g., via an internet network connection, and/or the like) to provide information to the control system 110 (e.g., Catalogue information and/or the like). For example, external contributor systems 150 can provide information regarding regulations 152, SCAP and/or similar configurations 154, DHS and/or similar configurations 156, and business models 158 to the control system 110 (e.g., to provide new Control Guidelines and/or similar information to control database 114). In some implementations external contributors can also provide new Control Implementations and/or Control Assessors to the control database 114. As such, the external contributor systems 150 can be under control of and/or associated with government agencies, standards setting organizations, industry regulators, C&A organizations, and/or the like. In other embodiments, a user can manually enter changes and/or updates to regulations to control system 110.

Figure 2:
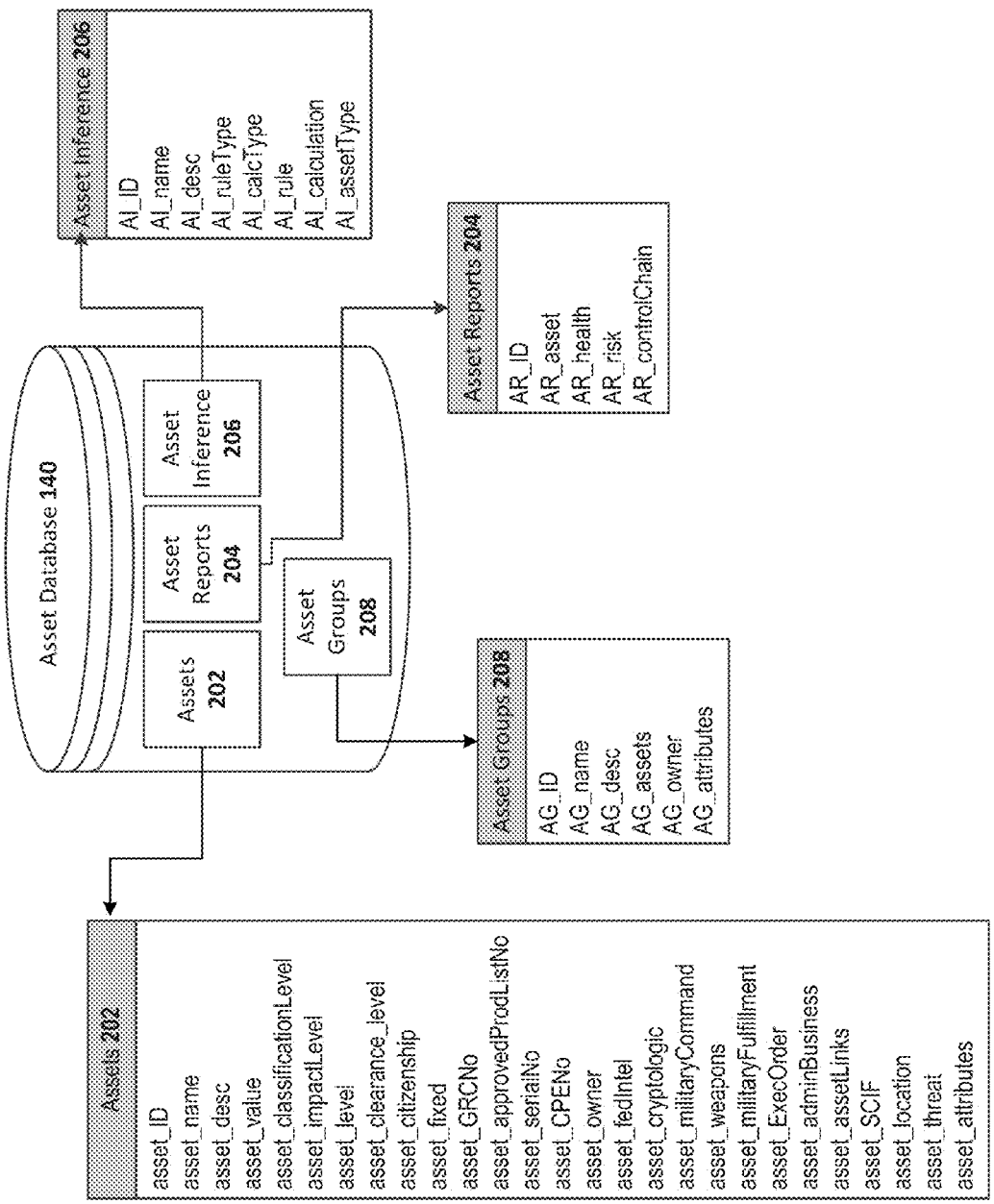
FIG. 2 is a schematic illustration of an asset database of the control system of FIG. 1.

FIG. 2 is a schematic illustration of an asset database 140, as shown in the control system 110 of FIG. 1. In some implementations, the asset database 140 can include at least an assets table 202, an asset reports table 204, an asset inference table 206, and an asset groups table 208. In some implementations, the assets table 202 can contain records of user assets, including values for at least some of the following attributes: asset_ID (e.g., an identifier for the asset record), asset_name (e.g., the name of the asset, in some implementations a text field entry), asset_desc (e.g., a description of the asset, in some implementations a text field entry), asset_value (e.g., a monetary or other value for the asset), asset_classificationLevel (e.g., a level of confidentiality of the asset, in some implementations a text field entry with categories including Top Secret, SCI, Secret, Confidential, Unclassified, Proprietary, Non-Proprietary, and/or the like), asset_impactLevel (e.g., such as confidentiality, integrity and availability impact levels), asset_level (e.g., a general level in a hierarchy that the asset belongs to, in some implementations a text field entry with categories such as Organizational Level, Mission/Business Process Level, Information System Level, and/or the like), asset_clearance_level (e.g., security clearance level required for access to the asset or the clearance level of the asset itself when the asset is a user or person), asset_citizenship (e.g., the asset owner's citizenship, and/or any citizenship requirements for accessing the asset or the citizenship of the asset itself when the asset is a user or person), asset_fixed, asset_GRCNo (e.g., a GRC number), asset_approvedProdListNo, asset_serialNo (e.g., serial number of asset), asset_CPENo (e.g., a Common Platform Enumeration Number), asset_owner (e.g., owner of the asset), asset_fedIntel (e.g., whether the asset is involved in federal intelligence activities), asset_cryptologic (e.g., whether the asset is involved in cryptologic activities related to national security), asset_militaryCommand (e.g., whether the asset is involved in the command and/or control of military forces), asset_weapons (e.g., whether the asset is involved in and/or is an integral part of a weapon or weapons system), asset_militaryFulfillment (e.g., whether the asset is involved in federal intelligence activities), asset_ExecOrder (e.g., whether the asset is protected by procedures established for information that has been authorized under certain criteria established by an Executive Order, Act of Congress, and/or like entity in the interest of national defense or foreign policy), asset_adminBusiness (e.g., whether the asset is used in routine administrative and/or business activities), asset_assetLinks (e.g., whether the asset has access and/or a relationship to other assets), asset_SCIF (e.g., whether the asset is authorized for processing or open storage of information processed by the system, such as Sensitive Compartmented Information Facility and/or the like), asset_location (e.g., the physical and/or logical location of the asset), asset_threat (e.g., whether the asset is a security and/or other threat), asset_attributes (e.g., additional attributes associated with the asset), and/or the like.

The asset reports table 204 can contain records of the security health and/or security risks of security solutions linked with various assets (e.g., can contain records indicating whether the assets are properly protected). Each record can contain values for at least some of the following attributes: AR_ID (e.g., an identifier of an asset report), AR_asset (e.g., the asset to which the report is related), AR_health (e.g., the health evaluation of the asset), AR_risk (e.g., the Risk Score of the asset), AR_controlChain (e.g., the Control Chain associated with the asset), and/or the like. The asset inference table (also referred to as an asset inference engine, and/or the like) 206 can contain records of rules and/or calculations used to determine information for dynamically-added and/or discovered assets, e.g., attributes for the discovered asset. Each record in the asset inference table 206 and can record values for at least some of the following attributes: AI_ID, AI_name, AI_desc, AI_ruleType, AI_calcType, AI_rule, AI_calculation, AI_assetType, and/or the like. The asset group table 208 can contain records of groups of related assets (e.g., related by user, type, security level, asset attributes, and/or the like). Each record can contain values for at least some of the following attributes: AG_ID, AG_name, AG_desc, AG_assets, AG_owner, AG_attributes, and/or the like. For example, a document asset can have the following exemplary values for its attributes:

```
<AG_ID>379283929</AG_ID>
<AG_name>"Budget Documents"</AG_name>
<AG_desc>"Internal documents relating to budget proposals, approved
budgets, and budget considerations for Project A"</AG_desc>
<AG_assets>98889878, 82987394, 9387932749, 9438729</AG_assets>
<AG_owner>"Exemplary Industries"</AG_owner>
<AG_attributes>("asset_types",    "documents"),
("asset_location", "1.1.1.1")</AG_attributes>
```

Figure 3:
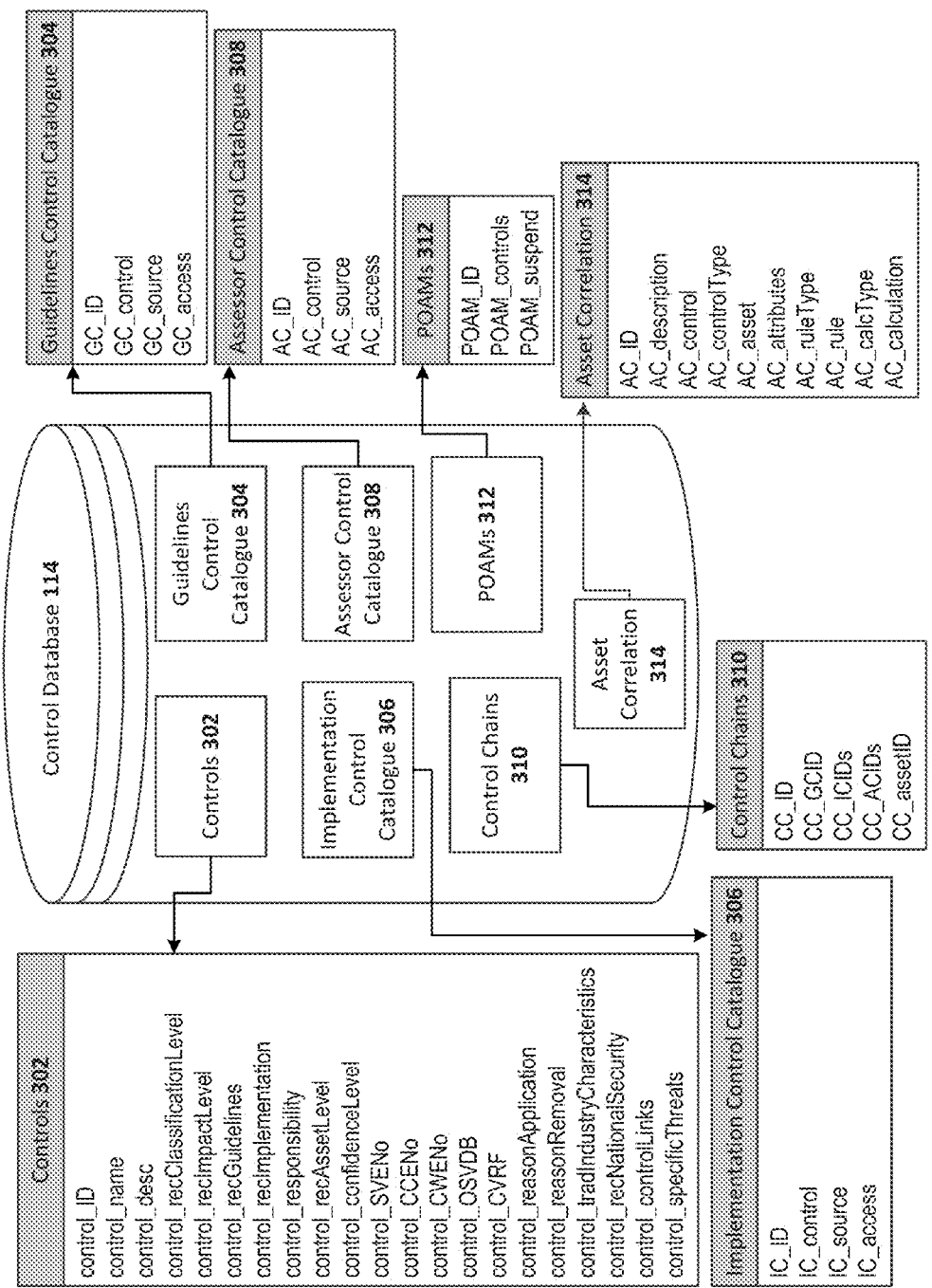
FIG. 3 is a schematic illustration of a control database of the control system of FIG. 1.

FIG. 3 is a schematic illustration of a control database 114, as shown in the control system 110 of FIG. 1. In some implementations, a control database 114 can include at least a Controls table 302, a Guideline Control Catalogue table 304, an Implementations Control Catalogue table 306, an Assessor Control Catalogue table 308, a Control Chains table 310, a POAMs table 312, and an Asset Correlation table 314. In some implementations, the Controls table 302 can contain records for a variety of different types of Controls (e.g., Control Guidelines, Control Implementations, Control Assessors, and/or the like). Each record can include values for at least some of the following attributes: control_ID (e.g., an identifier of a control), control_name (e.g., a name of a control), control_desc (e.g., a description of a control), control_recClassificationLevel (e.g., a recommended hierarchical classification level for controls; for example, a recommendation that the control should be used with assets having a "Top Secret" classification level), control_recImpactLevel (e.g., an importance or impact level of an asset that the control is recommended to protect; for example, a recommendation that the control be used for assets with a "Moderate" impact level), control_recGuidelines (e.g., recommended Guideline Controls to use with an Implementation Control), control_recImplementation (e.g., recommended Implementation Controls to use with an Assessor Control), control_responsibility (e.g., individual, individuals and/or asset responsible for the health of a Control Chain, which can include entities other than the asset_owner, and can also be linked to particular assets), control_recAssetLevel (a hierarchical level of an asset recommended for the control), control_confidenceLevel, control_CVENo (e.g., Common Vulnerability and Exposure number, used to denote vulnerabilities known in devices), control_CCENo (e.g., Common Configuration Enumeration number, used to denote portions of device configurations), control_CWENo (e.g., Common Weakness Enumeration number), control_OSVDB (e.g., Open Source Vulnerability Database indicator), control_CVRF (e.g., Common Vulnerability Reporting Framework indicator), control_reasonApplication (e.g., reason why user applied a particular Control or Control Chain to an asset), control_reasonRemoval (e.g., reason why user did not apply a particular recommended Control or Control Chain to an asset), control_tradIndustryCharacteristics, control_recNationalSecurity (e.g., if the Control is recommended for National Security systems), control_controlLinks (e.g., any related Controls), control_specificThreats (e.g., any specific threats against which the Control protects), and/or the like.

The Guideline Control Catalogue table 304 can contain records for each of the Control Guidelines specified in the control database 114. Each Guideline Control Catalogue entry can contain values for at least some of the following attributes: GC_ID, GC_control (e.g., a definition and/or description of the Guideline Control), GC_source (e.g., who provided the Guideline Control), GC_access (e.g., who can access the Guideline Control entry), and/or the like. The Implementation Control Catalogue table 306 can contain records for each of the Implementation Controls specified in the control database 114. Each Implementation Control Catalogue entry can contain values for at least some of the following attributes: IC_ID, IC_control, IC_source, IC_access, and/or the like. The Assessor Control Catalogue table 308 can contain records for each of the Assessor Controls specified in the control database 114. Each Assessor Control Catalogue entry can contain values for at least some of the following attributes: AC_ID, AC_control, AC_source, AC_access, and/or the like. In some implementations, as an example of a set of controls, a Guideline Control can specify that a document with a certain clearance level can require at least two-factor authentication, an Implementation Control can implement a two-factor authentication process for the asset, and an Assessor Control can verify that the two-factor authentication process is properly implemented, can verify that the document is properly protected based on the Guideline Control components and the results of the verification process implemented by the Implementation Control, and/or the like.

The Control Chains table 310 can contain records of Control Chains submitted and/or selected by external contributors and/or users. Each record can contain values for at least some of the following attributes: CC_ID, CC_GCID (e.g., the Guideline Control entry ID for the Guideline Control being used in the Control Chain), CC_ICIDs (e.g., the Implementation Control entry IDs for the Implementation Controls being used in the Control Chain), CC_ACIDs (e.g., the Assessor Control entry IDs for the Assessor Controls being used in the Control Chain), CC_assetID (e.g., the asset entry ID for the asset the Control Chain is being applied to and/or generated for), and/or the like. The POAMs table 312 can contain records of POAMs specified by users for Control Chains. Each record can contain values for at least some of the following attributes: POAM_ID, POAM_controls (e.g., the Controls in the Control Chain that are affected by the POAM), POAM_suspend (e.g., how the POAM affects the specified Controls), and/or the like.

The Asset Correlation table 314 (also referred to as an asset correlation engine) can include records containing sets of rules and calculations that control system 110 can use to map Controls to assets in an efficient manner, such that assets are protected and that asset security complies with applicable industry and organizational guidelines. Each record can contain values for at least some of the following attributes: AC_ID, AC_description, AC_control, AC_controlType, AC_asset, AC_attributes, AC_ruleType, AC_rule, AC_calcType, AC_calculation, and/or the like.

Figure 4:
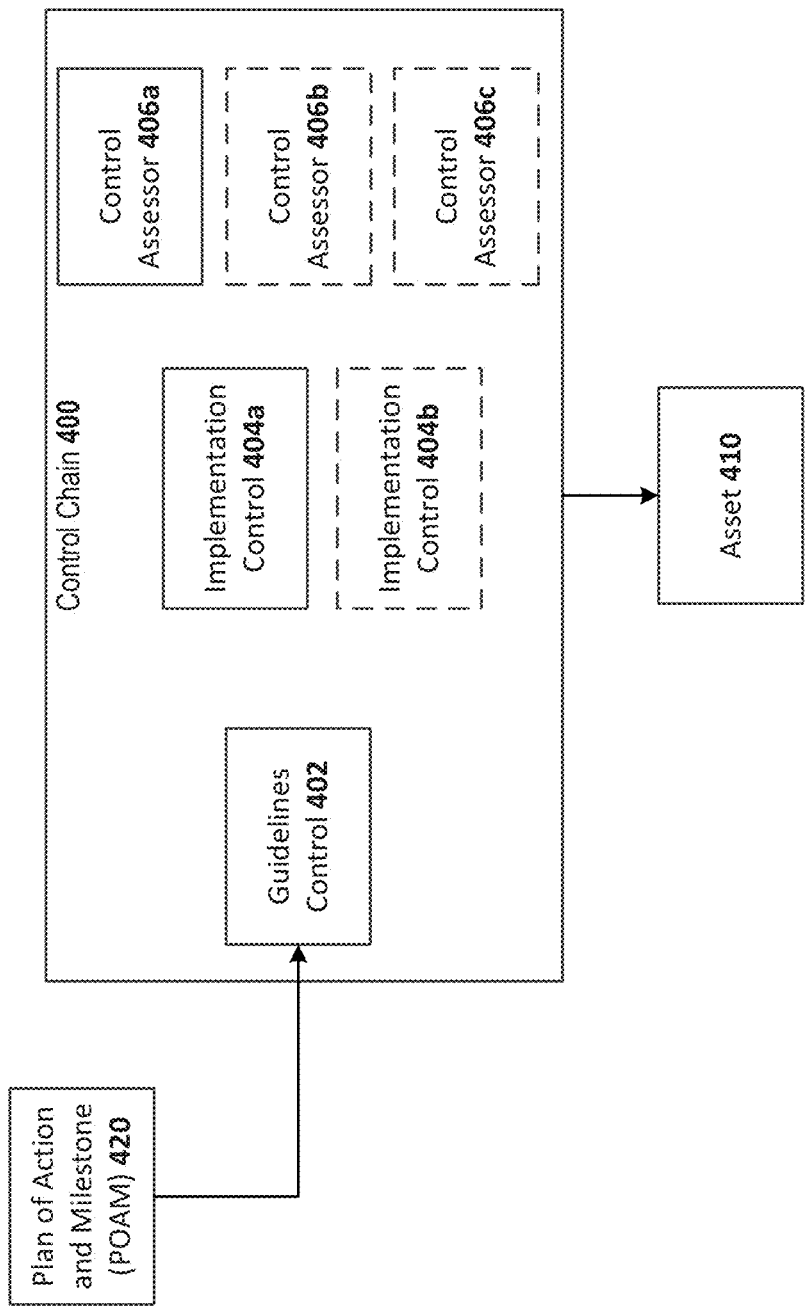
FIG. 4 is a schematic illustration of a Control Chain, according to an embodiment.

FIG. 4 is a schematic illustration of a Control Chain 400, according to an embodiment. In some implementations, the user can specify a Control Chain via selecting a Guideline Control, at least one Implementation Control, and at least one Assessor Control for an information system and/or other asset.

A Control Chain 400 can include a Guideline Control 402, for example, an industry standard and organizationally-defined safeguard and/or countermeasures and enhancements, along with security parameters set forth by security organizations (e.g., including but not limited to CNSSI 1253 parameters for National Security Systems). In some implementations a Guideline Control 402 can be based on security regulations, business needs, laws, Executive Orders, directives, policies, instructions, standards, guidance, best practices, and procedures for cybersecurity from such a security organization. The Control Chain 400 can also include at least one Implementation Control 404a-b. Each Implementation Control 404a-b can specify a security solution for protecting a particular asset 410 based on the specified Guideline Control 402. Implementation Controls 404a-b can include best practice methods for applying the guidelines to an information system such as, but not limited to, a security hardened component configuration. Implementations can include, but are not limited to, configurations to procedures and text documents, which can be stored in formats such as, but not limited to, Rich Text Format (RTF), eXtensible Markup Language (XML), The Extensible Configuration Checklist Description Format (XCCDF), and/or the like.

Each Implementation Control 404a-b can also be assigned at least one Assessor Control 406a-c, which can monitor the Implementation Controls 404a-b and can be used to determine the health and a risk score associated with each of the Implementation Controls 404a-b. Assessor Controls can be matched to Implementation Controls, e.g., based in part on a comparison of the control attributes of the Assessor Controls and the control attributes of the Implementation Controls. The Assessor Controls 406a-c can automatically or manually check the Implementation Controls 404a-b. Assessor Controls can also affect the health of Implementation Controls, e.g., by automatically changing settings for the Implementation Controls to improve their efficacy, and/ or the like. An Assessor Control 406a can be, but is not limited to, a script that automates verification to ensure the security control is applied to an information system and is still effective. Automatic Assessor Controls can leverage existing continuous monitoring solutions to perform these checks, to give the user the freedom to select and employ a substantially continuous monitoring solution appropriate for their environment and budget. Each Assessor Control is built for compatibility to run in a global passive mode or active mode. In some implementations a global passive mode can cause an Assessor Control in an information system to passively wait for messages from user assets before assessing the risk associated with the assets and their associated Control Chains. A global active mode can cause an Assessor Control in the information system to actively communicate with user assets in order to assess their Control Chain Risk Score and/or health. Users can also define their own Assessor Controls.

In addition to specifying Controls to use in the Control Chain 400, a system and/or user can also specify a POAM 420 for the Guideline Control in the Control Chain 400. The control system 110 can associate a POAM with the Control Chain in the database, and/or can include POAM instructions within the Control Chain (e.g., via including POAM instructions in the Control Chain data structure). The POAM can specify user goals and can affect the calculation of the Control Chain's health and risk score values, and/or actions associated with calculating the health and risk scores, to achieve the user goal. In some implementations, maintaining a user goal can involve suspending and/or disabling particular calculations to maintain portions of the system that are acting in a manner the user wants to maintain for her goal. For example a POAM 420 can specify which Implementation Controls are included in the health and/or risk score calculation (e.g., can disable and/or suspend calculating a health evaluation score for the Implementation Control, and/or ignore the Implementation Control in a calculation of the health of the Control Chain as a whole), can affect which Assessor Controls are able to modify the health of the Implementation Control(s) to which they are linked, and/or the like. POAM instructions can also disable an Assessor Control's ability to modify its Control Chain (e.g., to add and/or remove Implementation Controls, to modify Implementation Controls in the Assessor Control's Control Chain, and/or the like), such as, for example, when the health evaluation score does not meet pre-determined criterion (e.g., is less than a threshold).

Abstracting a traditional security control into three discrete components (and thus increasing the modularity of the system) allows for greater flexibility in reusing controls, modifying controls for updated and/or modified assets and/ or information systems, and/or the like. Specifically, for example, each Guideline Control, Implementation Control and Assessor Control can be used in a single Control Chain or in multiple Control Chains. As such, for example, an Implementation Control can be used to implement multiple guidelines representing by Guideline Controls. In such an example, an Implementation Control can be linked to a first Guideline Control via a first Control Chain and can be linked to a second Guideline Control via a second Control Chain. Thus, the same Implementation Control can be used to implement multiple guidelines. Similarly, Assessor Controls and/or Guideline Controls can be used in multiple Control Chains.

Additionally, in some implementations, Controls may be dynamically updated, for example, based on changing security guidelines and/or the like. For example, the control system 110 can receive an indication that the requirements of a Guideline Control (e.g., regulations and/or like rules embodied in the Guideline Control) have changed and/or been modified (e.g., by a government and/or other security-related organization). Based on how the Guideline Control is modified as a result of the new and/or modified requirements, the control system 110 can add a new Implementation Control or set of Implementation Controls to Control Chains that include the Guideline Control, to satisfy the modified requirements of the Guideline Control. Additionally, the control system 110 can replace Implementation Controls in Control Chains that include the Guideline Control, with a new Implementation Control or set of Implementation Controls to satisfy the modified requirements of the Guideline Control, and/or the like.

Figure 5A:
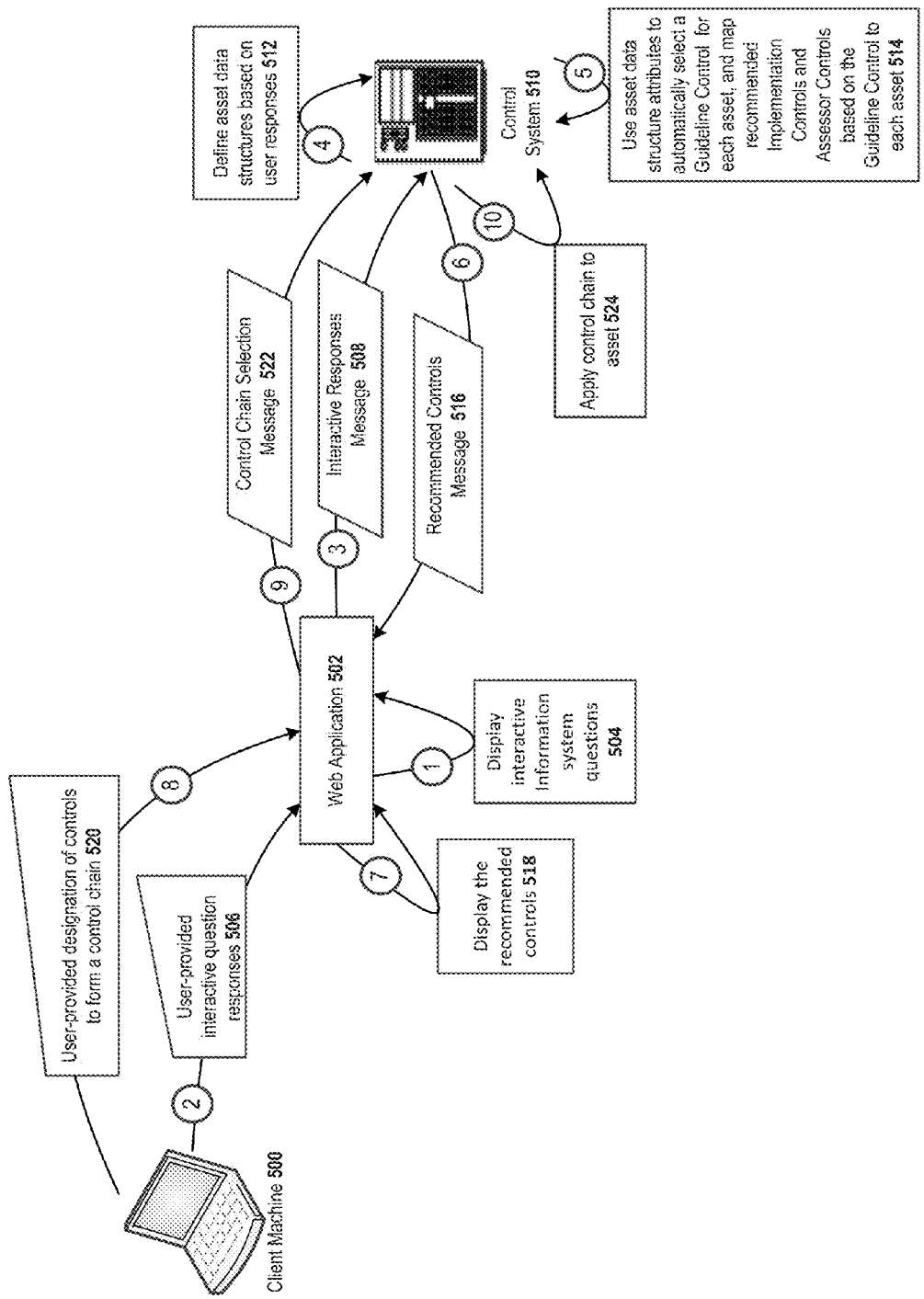
FIG. 5A is a flow diagram of defining a Control Chain for an asset, according to an embodiment.

FIG. 5A is a flow diagram of defining a control chain for an asset, according to an embodiment. In some implementations, a UI application 502 (e.g., a website, a web applet, and/or the like) can be accessed by a user, e.g., via installed UI application software on a user-owned device, e.g., client system 100 in FIG. 1, having the user's client system 100 connect to the UI application via using a logical address (e.g., a network address) to establish a network connection to the UI application, and/or the like. The UI application 502 can display on a client machine 500 interactive information system and/or asset questions 504. In some implementations, questions can include questions directed to attributes of the assets and/or information system, system goals, and/or the like. Such questions can be used to determine, for example, what assets the user wishes to protect, details about said assets, and/or overarching business goals. The client machine 500 can accept input from a user 506, in the form of interactive question responses to the dynamically-generated questions provided through the UI application 502. The UI application 502 can provide the user's responses to control system 510 (e.g., via an interactive responses message 508 to the control system 510). In some implementations the message can be a Hypertext Transfer Protocol Secure (e.g., HTTP(S)) POST message to the control system 510. The control system can define an asset data structure and/or several asset data structures 512 based on the user's responses to the interactive questions, and can store this asset data structure in the asset database 140 (e.g., see at least FIG. 2).

In some implementations, instead of providing interactive questions to the user to determine new assets (e.g., allowing manual addition of assets to the control system 510), the control system 510 can instead receive an indication that a new asset has been added to the client's information system and/or the like (e.g., the control system 510 can receive an indication that a new document was saved to a server asset, that a new server was added to an information system asset, that new business personnel not associated with any known assets have been added to the business, and/or the like). The control system 510 can use attribute information and/or other information from existing asset records to automatically generate an asset data structure for the new asset. For example, if the control system 510 determines that a new document has been saved to a server, the control system 510 can determine commonly-used attributes for documents, e.g., based on other document assets, and/or can automatically generate a customized collection of attributes for the new document based on parsing the new document and determining the new document's features, and/or the like. The control system 510 can use these automatically-generated attributes to populate the new asset data structure, without direct user input about the document's attributes.

The control system 510 can then use the asset data structure(s) to automatically select Guideline Controls for each defined asset 514 (e.g., based on industry standard security control matrices such as, but not limited to, NIST SP 800-53 and CNSSI 1253 along with organizationally defined parameters). In some implementations, users can later add and/or remove Guideline Controls to assets and/or the information system (e.g., using a drag-and-drop interface between the user's Private Control Catalogue and the recommended Guideline Controls from an Aggregated Control Catalogue on the control system 510). The Guideline Controls can be further refined via user-specified POAMs (e.g., see at least FIG. 5B for more details). The control system 510 can further determine recommended Implementation Controls and Assessor Controls for each Guideline Control for each asset (e.g., based on the attributes of the Guideline Controls and/or the like).

After Guideline Controls and recommended Implementation Controls and Assessor Controls are determined, the control system 510 can send a recommended controls message 516 to the UI application 502, which can display the recommended Controls 518 to the user for review and selection. The user can provide selections and/or designations of Controls 520 to form a Control Chain for each asset. In some implementations, the user can instead be able to search through and manually select any Implementation Controls and/or Assessor Controls available in the control system 510.

The UI application 502 can provide the information to the control system 510 via a control chain selection message 522 containing the user's selections of Controls to apply to the assets. Based on the user's selections for a particular asset, the control system 510 can, e.g., via the use of a data storage module, store the Control Chains in a database, and can apply the Control Chains to the applicable assets 524.

Figure 5B:
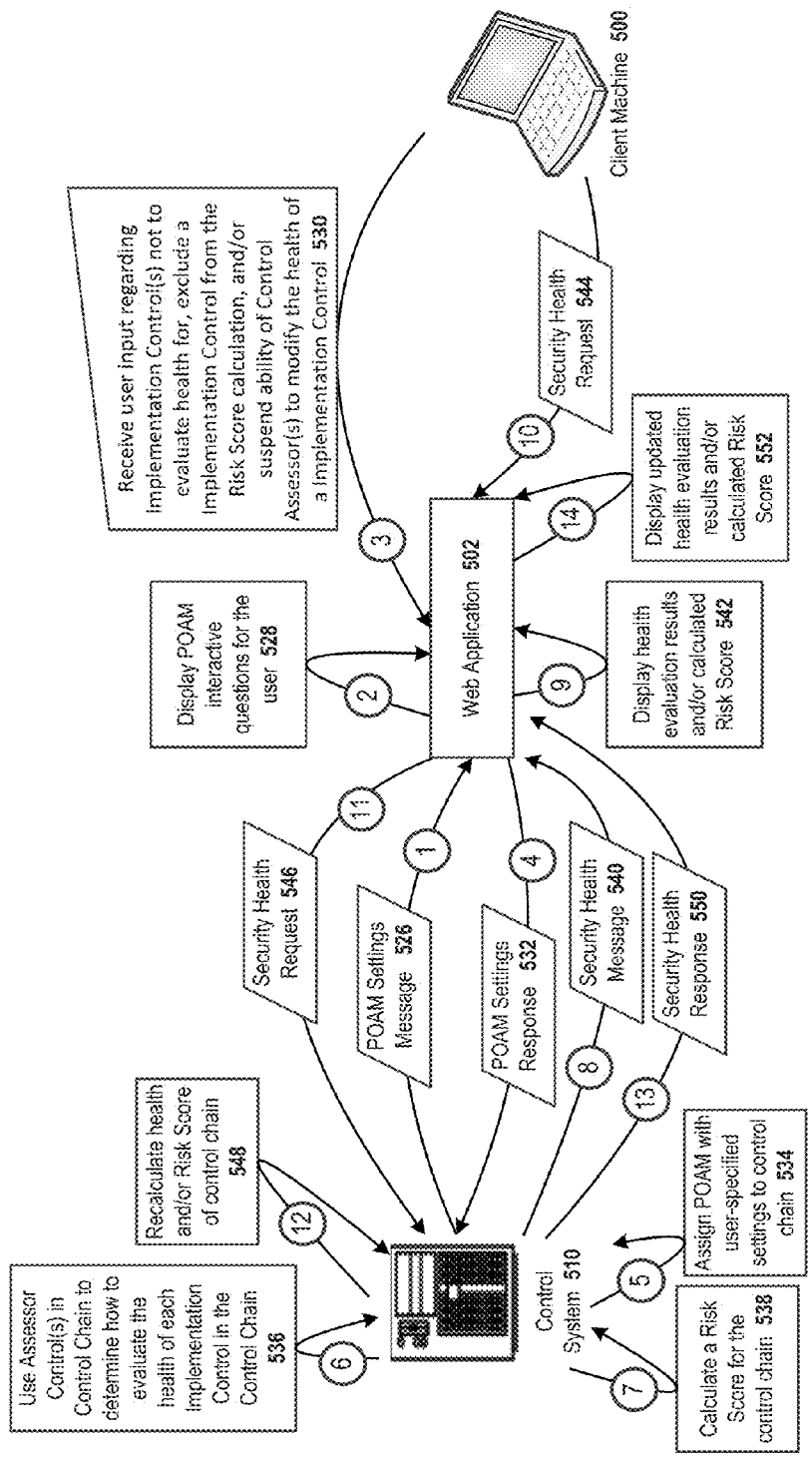
FIG. 5B is a flow diagram of evaluating the health of a Control Chain for an asset, according to an embodiment.

FIG. 5B is a flow diagram of evaluating the health of a control chain for an asset, according to an embodiment. The control system 510 can send questions to the UI application 502 (e.g., while determining information about the assets being included, and/or the like) via a POAM settings message 526. The UI application can display a POAM-related set of interactive questions 528, a POAM setting customization interface for the user, and/or a similar interface for obtaining information from the user. The user, via a client machine 500, can provide input via business goals and/or other information affecting the Control Chain for a particular asset 530 (e.g., Implementation Controls not to evaluate for health scores, Implementation Controls to exclude from a risk score calculation, Assessor Controls to suspend, and/or the like). Suspending an Assessor Control can include preventing the Assessor Control from modifying and/or assessing the health of its associated Implementation Controls. The UI application 502 can forward the user data to a portion of the control system 510 (e.g., the control database), via a POAM settings response 532. The control system 510 can assign the user-specified POAM settings to a Control Chain 534, which is also specified by the user (e.g., before the POAM is specified, after the POAM is specified, or concurrently with the specification of the POAM, and/or the like). The control system 510 can use the Assessor Control(s) in the relevant Control Chain to determine how to evaluate the health of each Implementation Control in the Control Chain 536. The control system 510 can also calculate a Risk Score 538 for the Control Chain based on the Controls in the Control Chain and based on the POAM.

In some implementations, the control server 510 can track the health of an Implementation Control using the automatic or manual Assessor Control(s) assigned to the Implementation Control. Assessor Controls can include at least, for example, four different general settings, including but not limited to the Assessment Frequency (AF), the Zero Response Degradation Rate (ZRDR), the Negative Response Degradation Rate (NRDR) and the Positive Response Restoration Rate (PRRR). An AF setting can be a user-definable frequency for how often an Assessor Control should assess the health and/or Risk Score of an Implementation Control. ZRDR, NRDR, and PRRR can be exemplary responses the system can expect from polling assets and/or information systems. For example ZRDR responses indicate that no response was obtained from the asset and/or information system associated with the Implementation Control being assessed by the Assessor Control, and therefore that the Implementation Control could not be assessed. ZRDR responses can trigger raising the Risk Score for the nonresponsive asset. NRDR responses can indicate that communication with the asset and/or information system was successful, but that the Implementation Control being assessed by the Assessor Control did not appear to be working as intended, or could not be found protecting the asset. NRDR responses can trigger a rise in the Risk Score for the asset. PRRR responses can indicate that both communication with the asset and/or information system was successful, and that the Implementation Control the Assessor Control is assigned to evaluate is working as expected. PRRR responses can trigger a reduction in the Risk Score for the asset.

In some embodiments, an independent communication module can assist in communication with devices and/or monitoring solutions (e.g., checking a substantially continuous monitoring solution for a specific asset with specific attributes) to gather information for an Assessor Control to assess Implementation Controls (e.g., to perform a health evaluation score calculation for one or more of the Implementation Controls). The communication module can support passive and/or active global modes (e.g., passive and/or active monitoring of assets and their respective Control Chain health and/or Risk Scores). A scale for each setting, a number of days and hours and/or the percentage amount of an Implementation Control's health score and/or value to degrade or restore, can be fine-tuned for each organization. The AF set by the user can instruct the control system 510 how often to execute the Action of the Assessor Control if automatic, or how often to expect an update if manual. The ZRDR set by the user can decrease the health score and/or value of an Implementation Control to which the ZRDR is applied by the set amount, if no response is received at the AF, regardless of whether the Assessor Control is manual or automatic. The NRDR set by the user can decrease the health of the Implementation Control to which the NRDR is applied (e.g., by a set amount when a negative response is received). A negative response can be defined by the Assessor Control's Action. The PRRR set by the user can increase the health of the Implementation Control to which the PRRR is applied (e.g., by a set amount when a positive response is received). A positive response can be defined by the Assessor Control's Action.

The control system 510 can store the calculated health of the Implementation Control defined by the Assessor Controls attached to the Implementation Control, over a period of time, to determine the Implementation Control's Sufficiency Rating. The Sufficiency Rating can be calculated as an average of the health of the Implementation Control over a given period of time. The Assurance Rating of an Implementation Control can be a measurement used to inform the information system owner of the health of an Implementation Control when the Implementation Control is provided by another entity and/or is related to another Control. This helps to inform users who are inheriting Controls from other entities, about health degradations of the same controls in other systems, or about health degradations of related Controls, as long as both systems communicate with the control system 510.

The Confidence Level can be a measurement of a level of confidence into which an organization can put a defined Assessor Control. The Confidence Level can depend at least in part on the identity of the developer of the Assessor Control. In some implementations the Confidence Level can be set by users or control system administrators. Each Assessor Control can determine the health of each Implementation Control to which the Assessor Control is attached. The health of Implementation Controls can be calculated as an average of the health of the Implementation Controls attached to the Guideline Control which exists in the same Control Chain as the Assessor Control. The health of each Implementation Control assigned to an information system can determine the overall Risk Score of the information system. Implementation Controls can be assigned weights to align with industry best practices so that the health of the Implementation Controls can have a greater impact on the Risk Score of the information system. The Risk Score can be a weighted average of the Implementation Controls within an information system and can be represented as Low, Moderate, High or Critical. This can help allow officials and other users of the system to assess the risk of information systems within an organization, the risk of assets a user controls, and/or the like.

Information system Risk Scores can also be averaged together to calculate an overall Enterprise Risk Score for an organization. The input data elements can be stored within a database that maintains one to many relationships between data input by the user. This can allow the input information to be associated with other details and information that can be gathered throughout the execution of the C&A and A&A process (or other risk mitigation, protection, best practice or regulatory compliance processes). This can also allow custom reports to be generated, that can employ data mining algorithms that convey information about the information systems being protected, including, but not limited to, health and status over periods of time. Users can request reports from the control system 510, which can be configured to retrieve the Control Chain attribute data that can be used in a report about the information systems and the Control Chains that protect the information systems. The Control Chain attribute data can include, for example, a control chain performance indicator, a control chain health evaluation score, control chain asset mapping, asset attributes associated with an asset in the control chain asset mapping, control attributes associated with each of the Guideline Control, Implementation Control, and/or Assessor Control within the Control Chain, and/or the like. The control system 510 can provide the health evaluation and/or risk score data to the user via a security health message 540 conveying the information to the UI application 502. The UI application 502 can display the health evaluation results and/or the calculated risk score 542.

The user can subsequently be able to request updates on the health of Implementation Controls for various assets (e.g., via submitting a security health request 544 to the UI application 502, which can forward the security health request 546 to the control system 510). The security health requests 544 and 546 can include information about the asset to which a Control Chain has been applied, relevant Implementation Controls for the asset, and/or the like. The control system 510 can recalculate the health and/or Risk Score for the Control Chain associated with the asset 548, and can return the health and/or Risk Score to the user via sending the data in a security health response 550 to the UI application 502. The UI application 502 can then display the updated health evaluation results and/or the updated Risk Score for the Implementation Controls for the asset 552. The user can use the updated results to determine how to modify Control Chains and/or POAMs for maintaining good health evaluation and/or Risk Score values.

For example, Assessor Controls can be configured to perform health evaluation score calculations for Implementation Controls, and can be configured to remove an Implementation Control from a Control Chain if the result of a health evaluation score calculation does not meet a pre-determined health evaluation criterion (e.g., the result is less than a health evaluation score threshold). The Assessor Controls can also add new Implementation Controls to the Control Chain if the health evaluation score calculation for a particular Implementation Control and/or an entire Control Chain does not satisfy pre-determined health evaluation criterion. Assessor Controls can also modify an Implementation Control if the result of a health evaluation score calculation for the Implementation Control does not meet a pre-determined health evaluation criterion (e.g., the Assessor Controls can affect which scripts in an Implementation Control are run, how they are run, and/or the like). Assessor Controls can also schedule subsequent health evaluation score calculations for the Implementation Controls and/or a Control Chain. For example, if a result of the health evaluation score calculation does meet a pre-determined health evaluation score criterion (e.g., the result is meets or exceeds a health evaluation score threshold), the Assessor Controls can schedule a periodic health evaluation check/status update to determine whether the health evaluation score calculation meets the pre-determined health evaluation score criterion at a subsequent time.

Figure 6A:
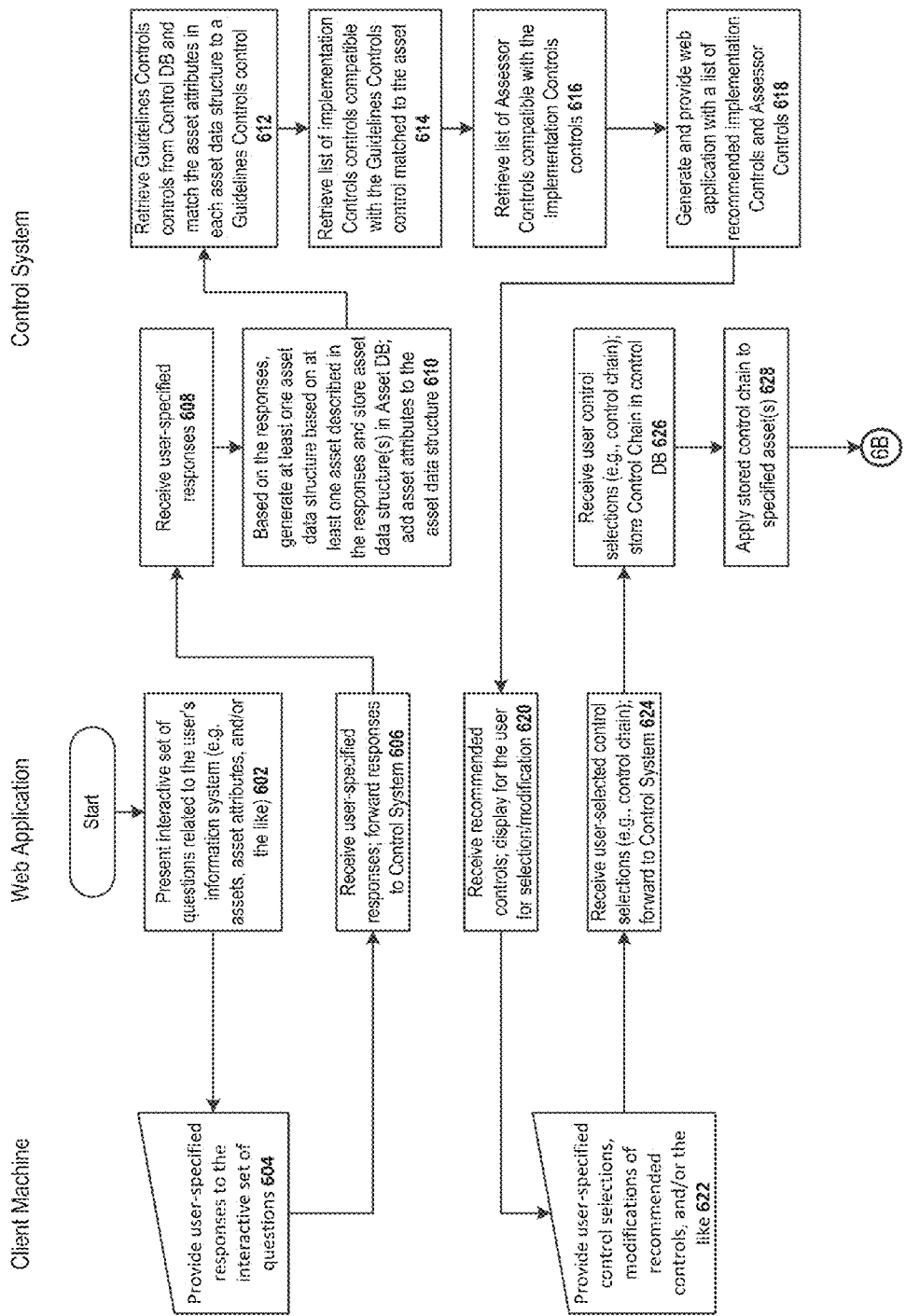
FIG. 6A is a logic flow diagram of defining a Control Chain for an asset, according to an embodiment.

FIG. 6A is a logic flow diagram of defining a Control Chain for an asset, according to an embodiment. In some implementations, a UI application can present an interactive set of questions to the user, 602. The interactive questions can be provided by a control system and can be related to the user's information system (e.g., the user's information system asset, the user's assets within the information system, the attributes for the user's assets, and/or the like). The user, on her client machine, can specify responses to the interactive set of questions, 604 (e.g., via filling in forms and/or selecting options provided within the UI application). The UI application, after receiving the responses, can forward the responses to a control system, 606. After receiving the response data from the UI application, 608, the control system can, based on the responses, generate at least one asset data structure as described in the responses, 610. Asset data structures can be stored in an asset database 140 in the control system (e.g., see at least FIG. 2).

Asset data structures can also include asset attributes and/or attribute values based on the data provided in the user's responses. For example, if the user's responses indicate that the user has a server asset, the control system can define an asset data structure indicating that the user has a server asset, and can add attributes and/or attribute values to the asset (e.g., the IP address of the server, the Media Access Control (MAC) address of the server, and/or the like). If the responses indicate that the user has a document asset, the data structure generated for the document asset can also be assigned attributes including the document security level, the size of the document, and/or the like. The user can also add assets directly into the user space, without providing responses to the question and answer guide, and can begin setting the attributes of each of the assets that will be added to the user's asset inventory.

After the asset data structure has been successfully stored in the asset database and modified with user-specified attributes, the control system can retrieve Guideline Controls, 612, e.g., from a control database in the control system. The control system can use asset attributes and/or other asset data in the asset data structure to match the asset to a suitable and/or an optimal Guideline Control. For example, server assets can use and/or support different security guidelines than document assets, and/or can have different recommended regulations and/or the like for dealing with the security of each asset type. Thus, a server asset can be best matched with one subset of the Guideline Controls in the control database that specifically relates to how to best protect servers, while a document asset can be best matched with another subset of the Guideline Controls in the control database relating specifically to regulations for protecting documents. In some implementations, rather than have the control system determine the applicable Guideline Control, the control system can send a list of recommended Guideline Controls to the user for her to review, and for her to select the Guideline Control she would like to use for the asset.

After a suitable Guideline Control for the asset has been identified, the control system can retrieve from the controls database a list of Implementation Controls compatible with the optimal Guideline Control, 614. Implementation Controls can be matched to the Guideline Control based on whether the Implementation Controls match the security requirements, preferred business practices, and/or like rules specified in the Guideline Control (e.g., whether the methods and/or strategies of providing security specified in the Implementation Controls match the security needs of the asset and/or organizational regulations relating to the asset, as specified by the Guideline Control).

After a subset of Implementation Controls has been selected, the control system can retrieve from the controls database a list of Assessor Controls, 616, compatible with the optimal Implementation Controls. In some implementations, Assessor Controls can be compatible with Implementation Controls if the Assessor is capable of assessing whether the methods and/or strategies for providing security to an asset are suitable for the particular asset, are working properly to protect a particular asset, are up-to-date in light of any updates to the Guideline Control and/or new guidelines, and/or similar information provided to the control system, and/or the like. The control system can generate and send a message to the UI application, 618, indicating that the system identified applicable sets of Implementation Controls and Assessor Controls to recommend to the user for use with each of the user's assets.

For each asset, the UI application can receive a representation of the recommended Controls for the asset, 620, and can display the representation for the user to select and/or modify the recommended Control options. For example, the UI application can display for the user the recommended Implementation Controls, and the Assessor Controls recommended to be used with the Implementation Controls. The user can select the Implementation Controls she would like to implement for her asset, and the Assessor Controls she would like to select for those Implementation Controls. The selection can be performed via a selectable menu, a drag-and-drop interface, radial and/or checkbox buttons, and/or the like. Alternatively, the user can be given the option of modifying parameters of the Implementation Controls and/or the Assessor Controls, for example, by being able to view the parameters of the Controls (e.g., steps used to protect the asset in an Implementation Control, a time interval that the Assessor Control automatically evaluates the health and/or Risk Score of the Implementation Control, and/or the like) and by changing values of those parameters if the user chooses to do so. The user can also request to view Controls which were not recommended, and can choose to select such Controls in lieu of the recommended Controls.

After the user has selected and/or otherwise specified which Controls she would like to use for the asset, the user can input the selections, 622, into the UI application. The selections can complete a definition of a security Control Chain for the asset. The UI application can receive the selections and forward the selections to the control system, 624, for further processing. The control system can receive the user selections, 626, and store the selections in a Control Chain data structure in the control database. In some implementations the user-selected Implementation and Assessor Controls can be linked along with the Guideline Control to form the Control Chain data structure. In some implementations, a separate entity from the user (e.g., an Accrediting Authority, Authorizing Official, and/or the like for an information system) can access the system and review and/or approve defined Control Chains (e.g., to ensure the selected Controls in the Control Chain can be combined, and/or the like). Once the entity has approved the Control Chain, the control chain can be linked with a particular asset and/or Control Assessors can begin assessing the control implementation to which they are attached and/or associated. In other implementations, the control system can automatically verify that the Control Chain can be approved for application to an asset. The Control Chain data structure can then be linked with the specified asset, 628, such that when the Control Chain is activated, the Control Chain can be configured to operate upon a particular asset for which it has been optimized. In some implementations Control Chains can be linked to a variety of assets that share attributes and/or other details with the asset for which the Control Chain was originally designed. A Control Chain can also be redefined and/or otherwise modified (e.g., by redefining the Control Chain to include more Implementation Controls or Assessor Controls, and/or the like).

Figure 6B:
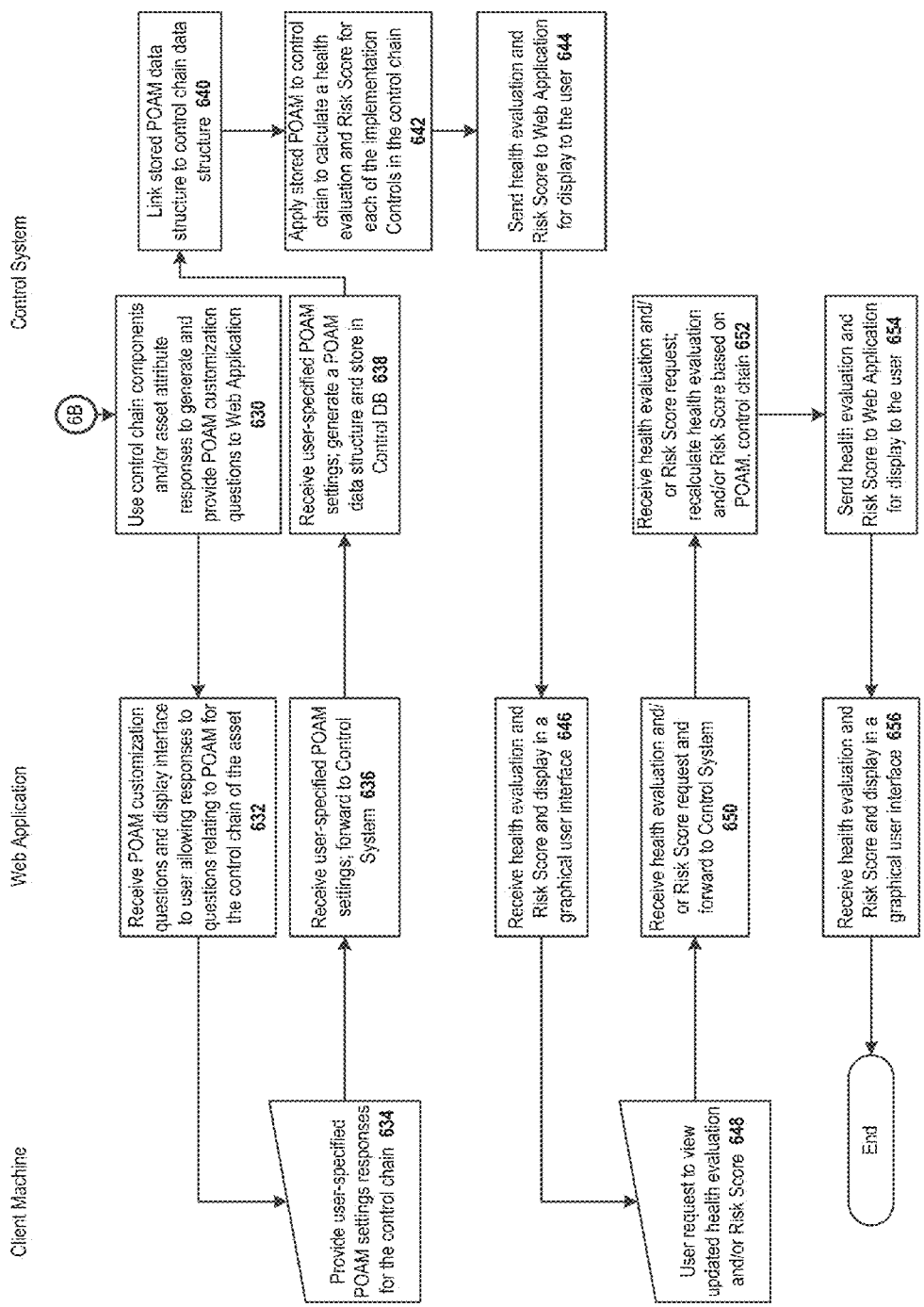
FIG. 6B is a logic flow diagram of evaluating the health of a Control Chain for an asset, according to an embodiment.

FIG. 6B is a logic flow diagram illustration of evaluating the health of a control chain for an asset, which occurs after step 628 in FIG. 6A. In some implementations the control system (e.g., in response to the definition of a Control Chain, in response to the user's responses to the interactive questions as described in FIG. 6A, and/or in response to an independent request to define a POAM) can generate and provide POAM customization questions to the UI application, 630, (e.g., in the form of a customization message and/or the like). The UI application can receive and display the questions, 632, for the user to provide answers and/or to otherwise specify settings for a POAM to be applied to a Control Chain for a particular asset. In other implementations, the user can be able to define and specify attributes for a POAM absent of question prompts (e.g., using form fields to specify attributes of the POAM, using a graphical interface to define and modify a POAM data structure, and/or the like). After the user has provided her desired POAM settings, 634, (e.g. via question responses, form-inputted settings, and/or the like) to the UI application, the UI application can forward the received responses to the control system, 636, (e.g., via a message and/or like mechanism). The control system can receive the user-specified POAM settings, and can generate a POAM data structure, 638, to store in the control database. The POAM data structure can be linked to any Control Chains for which it is applicable, 640, (e.g., the Control Chain(s) for particular sets of assets with the asset attributes used to generate POAM questions, the Control Chain which triggered the generation of the POAM, and/or the like).

The control system can use the POAM (e.g., can apply the POAM to its linked Control Chain(s)) to calculate a health evaluation and/or Risk Score, 642, for each Implementation Control in the Control Chain for a particular asset. For example, POAM settings can affect how an Implementation Control (or its associated Assessor Control) are factored into the health evaluation and/or Risk Score calculation, and/or how the Controls are able to act and/or be modified in light of the health evaluation and/or Risk Score calculation. The control system can then send the calculated health evaluation and/or Risk Score to the UI application, 644, such that the UI application can display the results of the calculation to the user, 646, via a graphical user interface. The user can have the option of editing the Control Chain, Controls in the Control Chain, the POAM, and/or like elements of her security solution for the asset based on the health evaluation and/or Risk Score calculated for the asset. As POAMs can be optional modifiers of Control Chains, in some implementations a user can choose not define and/or specify goals for a POAM, and can define and assess the Risk Score of a Control Chain without the use of a POAM.

In future iterations, the user can request an updated health evaluation and/or Risk Score for a particular asset, 648, (e.g., via the UI application). The UI application can forward such a request to the control system 650. The control system can then recalculate the health evaluation and/or Risk Score values, 652, based on the POAM for the Control Chain, the Control Chain for the asset, and/or the like. The control system can send the health evaluation and Risk Score to the UI application, 654, such that the UI application can display the calculated health and/or Risk Score for the user in a graphical user interface, 656. The user can request multiple updated calculated scores and/or health evaluations. The control system can also present to the user automatic reports of the health of the Control Chain and the security for the asset (e.g., based on the parameters of the Assessor Controls in the Control Chain, and/or the like).

Figure 6C:
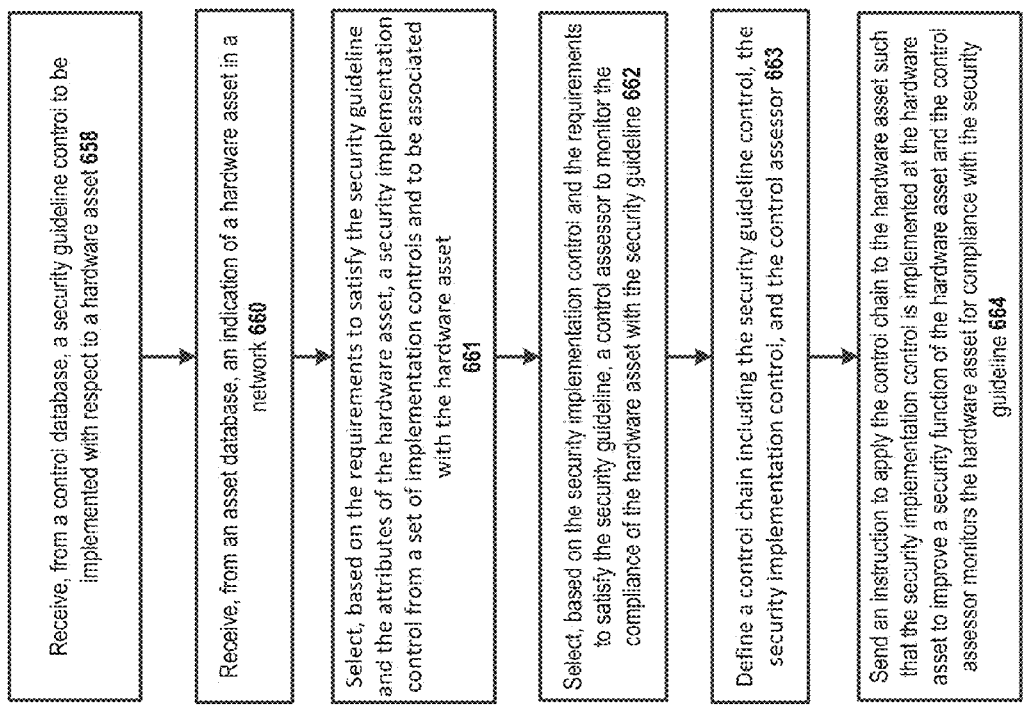
FIG. 6C is a logic flow diagram of defining a Control Chain for an asset, according to an embodiment.

FIG. 6C is a logic flow diagram of defining a Control Chain for an asset, according to an embodiment. In some embodiments, such a method can be performed by a control chain generation module. In some implementations, the control chain generation module can receive, at 658, from a control database, a security guideline control to be implemented with respect to a hardware asset. The security guideline control can include requirements to satisfy a security guideline associated with the security guideline control. The control chain generation module can also receive, at 660, from an asset database, an indication of a hardware asset in a network. In some implementations the indication of the hardware asset includes attributes of the hardware asset. The control chain generation module selects, at 661, based on the requirements to satisfy the security guideline and the attributes of the hardware asset, a security implementation control from a set of implementation controls and to be associated with the hardware asset.

After receiving the indication of a hardware asset in the network, the control chain generation module can select, at 662, based on the security implementation control and the requirements to satisfy the security guideline, a control assessor to monitor the compliance of the hardware asset with the security guideline. The control chain generation module defines, at 663, a control chain including the security guideline control, the security implementation control, and the control assessor. The control chain generation module, after defining the control chain, sends, at 664, an instruction to apply the control chain to the hardware asset such that the security implementation control is implemented at the hardware asset to improve a security function of the hardware asset and the control assessor monitors the hardware asset for compliance with the security guideline.

Figure 6D:
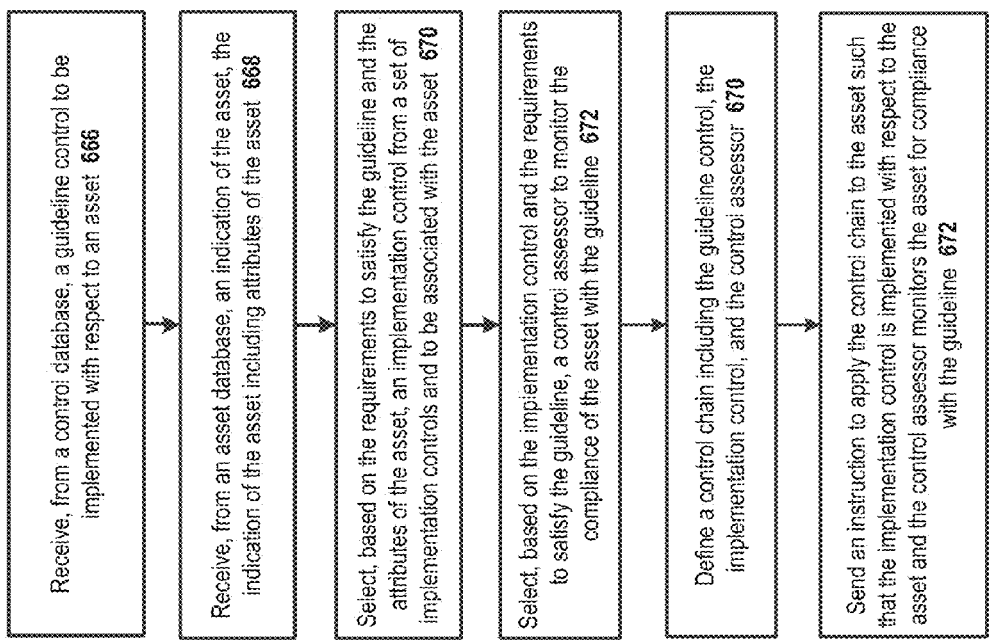
FIG. 6D is a logic flow diagram of defining a Control Chain for an asset, according to an embodiment.

FIG. 6D is a logic flow diagram of defining a Control Chain for an asset, according to an embodiment. In some embodiments, such a method can be performed by a control chain generation module of a control system (e.g., control system 110 of FIG. 1). In some implementations, the control system can receive, at 666, from a control database, a guideline control to be implemented with respect to an asset. The guideline control can include requirements to satisfy a guideline associated with the guideline control. The control system can receive, at 668, from an asset database, an indication of the asset. The indication of the asset can include attributes of the asset. The control system can then select, at 670, based on the requirements to satisfy the guideline and the attributes of the asset, an implementation control from a set of implementation controls and to be associated with the asset. After the implementation control has been selected, the control system can select, at 672, based on the implementation control and the requirements to satisfy the guideline, a control assessor to monitor the compliance of the asset with the guideline. The control system can then define, at 670, a control chain including the guideline control, the implementation control, and the control assessor, and send, at 672, an instruction to apply the control chain to the asset such that the implementation control is implemented with respect to the asset and the control assessor monitors the asset for compliance with the guideline.

Figure 7:
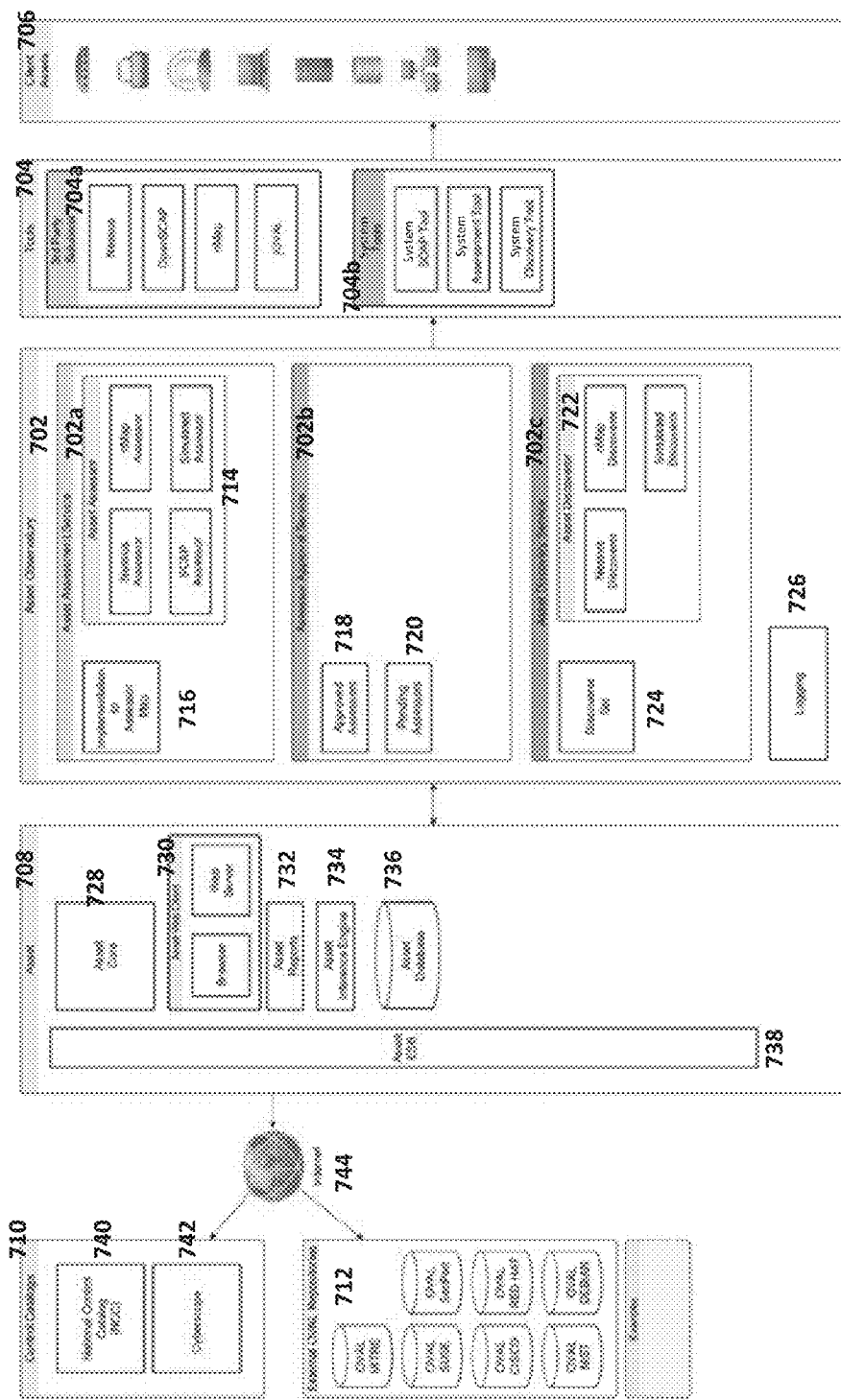
FIG. 7 is a schematic illustration of an asset compliance system, according to another embodiment.

FIG. 7 is a schematic illustration of a control system, according to another embodiment. A control system can include an Asset Observatory 702, which can contain a variety of services used in maintaining assets and asset security. For example, the Asset Observatory 702 can possess similar functionality to that of the Security Control Health Engine, and can include an Asset Assessment Service 702a, an Assessor Approval Service 702b, an Assessor Discovery Service 702c, and a Logging module 726.

The Asset Assessment Service 702a can specify how to assess the efficacy of the Implementation Control(s) for an asset, and/or the like. For example, the Asset Assessment Service 702a can use various tools such as the Nessus Assessor, nMap Assessor, SCAP Assessor, and a Simulated Assessor to gather the information required to determine if a Control Implementation is in place and working as intended. In some implementations, tools such as Nessus, nMap, SCAP, and Simulated can be software packages or Application Programming Interfaces that the system can use in the form of Assessor Controls in order to communicate with the various devices in the user's information system, such that the system and/or the user's information system can assess the Control Implementations applied to the user's various assets.

The Asset Assessment Service 702a can further include an Implementation to Assessor Map 716, which can allow translation of Implementation Controls such that Assessor Controls can interpret and evaluate the efficacy of the Implementation Controls, and an Asset Assessor Module 714, which can include various types of Assessor Controls, including but not limited to the Nessus Assessors, nMap Assessors, SCAP Assessors, and Simulated Assessors. An Assessor Approval Service 702b can approve Assessor Controls (e.g., Assessor Controls that external contributors, users, and/or like sources have provided to the system for use in the system). The Assessor Approval Service 702b can include records of Approved Assessor Controls 718 and Pending Assessor Controls 720. The Assessor Approval Service can be a module and/or service (e.g., a software module implemented in hardware, a hardware module and/or the like) for interacting with Control Chains being approved by a separate entity (i.e. Authorizing Official or Accrediting Authority).

An Assessor Discovery Service 702c can automatically discover assets and determine how to obtain new information about the assets, how to automatically associate existing Controls and/or the like to the assets (e.g., without user input), can scan for updates to existing assets (e.g., determine whether guidelines and/or implementations for the asset have been updated), and/or the like. For example, the Asset Discovery Service can use various tools to gather information from a user's physical electronic assets to automatically and dynamically populate the user's space (e.g., the asset inventory with which the user works) with assets and corresponding attributes. Assessor Discovery Service 702c can include a Discoveror Set 724, as well as Asset Discoveror categories 722 and/or types, including but not limited to Nessus Discoverors, nMap Discoverors, and Simulated Discoverors. The Logging module 726 can log and store logs relating to any of the Asset Assessment Service 702a, the Assessor Approval Service 702b, or the Assessor Discovery Service 702c, and/or other aspects of the Asset Observatory 702.

Assets can be stored and/or managed via an Asset System 708 configured to store asset data and/or to manage assets. For example, Asset System 708 can include an Asset Core 728 (e.g., similar to control system 110 shown and described with respect to FIG. 1), an Asset Web Client 730, an Asset Reports Module 732, an Asset Inference Engine 734, an Asset database 736, and an Asset ESB 738. Asset Web Client 730 can include a Browser and a Web server, and can be configured to generate and provide a web browser user interface to a user of the Asset System 708 such that the user can view and/or edit attributes and/or other details of the assets stored in the Asset database 736. The Asset Reports Module 732 can maintain reports related to the assets and/or Control Chains linked with the assets, and/or the like. The Asset Inference Engine 734 can use attributes, rules, calculations, and/or similar data from existing assets to determine how to automatically import, categorize, and store new assets without user intervention and/or input (e.g., by determining attributes and/or like information for particular types of assets, using the information to identify information of the dynamically-added asset to add to a data structure for the asset, and/or the like). The Asset Inference Engine 734 can also be combined with an asset correlation engine to identify appropriate Implementation Controls to assign to new and/or existing assets based on inferences drawn from user-specified Control Chains for other similar assets, based on rules and/or calculations specified for determining applicable Controls for particular assets, and/or the like. The Asset database 736 can store and maintain a variety of asset data structure records for the assets users have entered into the Asset System 708. The Asset Enterprise Service Bus (ESB) 738 can be a software interface between the Asset System 708 and other systems, through which other systems can interact with the Asset System 708 and vice-versa (e.g., to obtain asset data, to provide new information about assets, and/or the like).

The system can use Tools 704 to secure assets in the Asset System 708. For example, the system can use both third-party solutions 704a and internal tools 704b to protect client assets 706 (e.g., at least in part based on asset information provided by the Asset Observatory 702, and/or the like). Third-party solutions 704a include but are not limited to Nessus, OpenSCAP, nMap, and jOVAL tools, and/or the like, while internal tools 704b include but are not limited to System SCAP tools, System Assessment Tools, and System Discovery Tools. In some implementations internal tools can be at least partially derived from the functionality of the services included in the Asset Observatory 702.

Via network (e.g., internet) connections 744, the Asset System 708 and/or other components of the system can interact with control catalogues 710 and external OVAL repositories (e.g., an industry repository that can act as an external contributor to a user's Private Control Catalogue) 712. The control catalogues 710 can include an aggregated control catalogue 740 (e.g., a national control catalogue and/or the like), which can include Controls that various users, external contributors, and/or like entities have contributed to the catalogue, and which have been verified by the system. The control catalogues 710 can also include cyberscope catalogs (e.g., a Department of Homeland Security and Department of Justice run system that can act as an external contributor to a user's Private Control Catalogue) 742.

Figure 8:
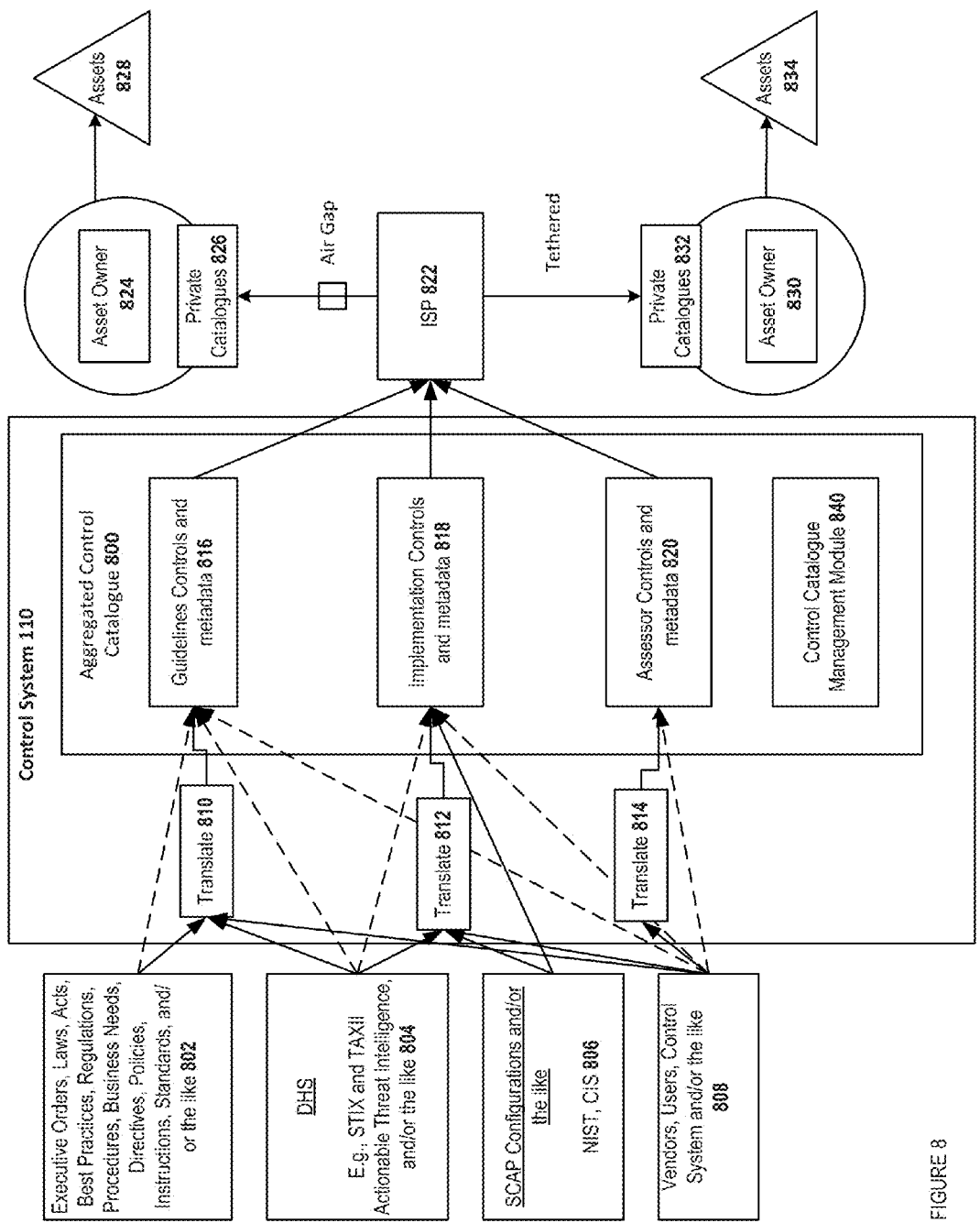
FIG. 8 is a schematic illustration of an aggregated control catalogue, according to an embodiment.

FIG. 8 is a schematic illustration of an aggregated control catalogue, according to an embodiment. In some implementations, one can use the systems and methods described herein to automatically determine how to securely configure assets and map Guideline, Implementation, and Asset Controls to client assets. The control system 110 (e.g., see at least FIG. 1 for further details), for example, can translate human-generated policies, regulations, and/or the like into machine-readable and machine actionable artifacts (e.g., in markup languages and/or the like), which can be used to define Guideline Controls and to allow automatic importation, selection, and application of Guideline Controls in the control system 110. Translating the human-generated text can include extracting data from the human-generated text and generating a markup language-based data structure and/or document (e.g., XML, DHS STIX, etc.) using the extracted data. Such a translation process can include adding any appropriate attributes to the data structure for association with assets and/or for faster processing of the markup language-based data structure. Because the markup-based data structure maps controls to attributes, controls can be automatically mapped to assets with corresponding attributes.

Once Guideline Controls have been defined, users can use the Guideline Controls to submit Implementation Controls to an Aggregated Control Catalogue 800 based on the regulations and/or the like specified in the Guideline Controls. Users can define Assessor Control data for each of the Implementation Controls and can submit their Assessor Controls to the Aggregated Control Catalogue 800, e.g., such that other users can view, select, download and use the Assessor Controls along with the Guideline and Implementation Controls. Users can also rate, rank, and/or otherwise evaluate Guideline, Implementation, and/or Assessor Controls, e.g., after using them in their own Private Catalogues, and/or the like, such that other users can view the ratings and/or rankings with the Controls as they search for Controls to add to their Private Catalogues, and/or the like. A control catalogue management module 840 in the control system 110 can monitor, approve, and/or otherwise manage submitted Controls, and/or access to controls in the Aggregated Control Catalogue 800.

For example, Executive Orders, Laws, Acts, Best Practices, Regulations, Procedures, Business Needs, Directives, Policies, Instructions, Standards, and/or the like 802 can be provided (e.g., by regulatory agencies and/or organizations, and/or like entities) via a human-readable (e.g., prose and/or essay) text format to the control system 110. The control system 110 can translate 810 the text into a machine-readable format (e.g., a markup language format and/or the like), and can parse the machine-readable formatted information to extract rules, attributes, and/or similar information used to generate Guideline Controls and Control metadata 816 based on the provided rules. The control catalogue management module 840 can store the Guideline Controls in an Aggregated Control Catalogue 800 on the control system 110. In some implementations, an Aggregated Control Catalogue 800 (e.g., a National Control Catalogue, a Central Control Catalogue, and/or the like) can include records of Guideline, Implementation, and Assessor Controls generated by the control system 110, generated by users, provided by security regulation organizations, provided by security solutions vendors, and/or submitted by a variety of entities.

The Guideline, Implementation, and Assessor Controls can be stored to define a central communal repository of Controls, which can then be selectively provided to users (e.g., based on the user's assets and/or Control needs) by the control catalogue management module 840, such that the users can define Control Chains based on the communally-aggregated set of Controls available. In some implementations submissions can be provided with an attribution to the contributor (e.g., the name of the organization and/or individual who developed the Control), or anonymously (e.g., such that an entity can elect to share vulnerability and/or security solutions without publicly indicating his identity). The control system 110 can use a verification system to verify that various Controls comport with other Controls in the system (e.g., that new Guideline Controls include concerns of Guideline Controls already stored at the control system, that an Assessor Control sufficiently evaluates the health of a Control Implementation to which the Assessor Control is assigned to evaluate, and/or the like), and can recommend specific Controls to users, for example, based on the predicted strength of the Control and/or reputation of the anonymous submitter (e.g., whether the anonymous entity tends to submit widely-adopted Controls which are evaluated as having good health and Risk Score values), and/or the like.

Similarly, DHS information 804 (e.g., Structured Threat Information eXpression (STIX), Trusted Automated eXchange of Indicator Information (TAXII) Actionable Threat Intelligence, and/or like information), which can include regulations and/or similar guidelines, and/or can also include scripts and/or other implementations of the regulations and/or similar guidelines, can be sent to the control system 110, and can be translated 812 by the control system 110 to generate Implementation Controls (e.g., based on provided algorithms and/or suggestions on how to enact the regulations and/or guidelines) and Control metadata 818 based on the information provided, and/or to generate Guideline Controls (e.g., based on the regulations and/or similar guidelines) and Control metadata 816 based on regulatory information and/or rules, which can be derived from the DHS information. SCAP Configurations 806 (e.g., from the National Institute of Standards and Technology (NIST), Center for Internet Security (CIS), and/or the like) can also be provided and translated 812 to generate Implementation Controls and Control metadata 818 based on the information provided. In some implementations, Security Content Automation Protocol) SCAP configurations 806 and configurations from the DHS information 804 can describe and explain the way in which an organization is adhering to a regulation and/or similar guideline, and can include stored procedures (e.g., scripts, code, data structures, objects, and/or the like) using languages including but not limited to eXtensible Configuration Checklist Description Format (e.g., XCCDF), Common Attack Pattern Enumeration and Classification (CAPEC), eXtensible Markup Language (XML), semantic web (e.g., RDF/OWL), JavaScript Object Notation (JSON), Malware Attribute Enumeration and Characterization (MAEC), ProtocolBuffers, and/or the like. Implementation Controls can use the code, script, object, and/or other data as received from various sources to implement a security solution, and/or can translate the code, script, and/or other data into a different format (e.g., into a different programming language, and/or the like) depending on the needs of the user. An Implementation Control can be applied to an asset, e.g., via adding the script, object, and/or similar data to software running on and/or acting upon the asset, to firmware on a machine asset, and/or the like. In some implementations, when a user defines a Control Chain from the Implementation Controls from the Aggregated Control Catalogue 800, the user can combine Implementation Controls in a modular manner to combine the functionality of various Implementation Controls, e.g., to avoid having to obtain an Implementation Control specific to a set of regulations and/or guidelines having components that are already implemented by separate Implementation Controls in the Aggregated Control Catalogue 800.

Finally, data from vendors, users, the control system 110, and/or the like 808 can be translated 814 for the purpose of defining Assessor Controls and Control metadata 820. In some implementations, Assessor Controls can include code, scripts, and/or similar data implemented via use of an Application Programming Interface (API), the Open Vulnerability and Assessment Language (OVAL), and/or the Open Checklist Interactive Language (OCIL) that, when executed, can determine whether an Implementation Control is protecting an asset, can determine whether the Implementation Control is protecting the correct asset, and/or the like. For example, an Assessor Control can verify that an asset has incorporated code from an Implementation Control into its software and/or firmware, and/or the like. In some implementations the information need not be translated, and can be presented to the system in a format from which the system can readily understand and generate Controls and metadata (e.g., in a markup language format, and/or the like).

After Controls have been defined based on the aggregate data received and processed by the system, the system can provide the information to users (e.g., asset owners 824 and 830), e.g., via Air Gap and/or Tethered internet connections through an Internet Service Provider (e.g., ISP) 822 and/or a similar network type. Each asset owner 824 and 830 can have her own private catalogue 826 and 832, respectively, which can store Controls from the Aggregated Control Catalogue 800 which best fit with her particular assets (e.g., assets 828 and assets 834, respectively), and can store internally-developed Guideline, Implementation, and Assessor Controls. In some instances, users can choose which Controls are pushed to them (e.g., based on their preferences for locally storing various Controls) or the control system 110 can automatically send Controls to the user's Private Control Catalogue (e.g., based on the user's assets and/or currently-used Controls, and/or the like). In other instances, users can search the Aggregated Control Catalogue 800 for Guideline Controls, Implementation Controls, Assessor Controls and/or Control Chains. Such a search can be, for example, based on a regulation, standard and/or guideline the user is attempting to satisfy, an Implementation Control and/or an Assessor Control the user is currently using, and/or any other suitable search criteria. Users can then request Control Chains and/or particular Controls, which may be provided to them by the control catalogue management module 840.

Users can then rate, comment upon, and/or otherwise evaluate Controls (e.g., Implementation and/or Assessor Controls) in the Aggregated Control Catalogue 800, including Controls ultimately stored in the user's Private Control Catalogue. Such ratings and/or comments can be aggregated and/or standardized such that the control system 110 can provide standardized ratings and/or evaluations of each Control in the Aggregated Control Catalogue 800. Users can then choose from which sources the control system 110 sends Controls to them (e.g., a user can specify that she would not like Controls which have been anonymously submitted, or have been submitted by a particular individual, and/or the like), rating and/or evaluation criteria for Controls sent to them (e.g., a user can specify that only highly-rated Controls be sent to and stored in the user's Private Control Catalogue), and/or the like. In some implementations, Guideline Controls, Implementation Controls, and Assessor Controls can be accessible to the user, and the user can request said Controls for (or have said Controls automatically sent to) her Private Control Catalogue.

Using the Aggregated Control Catalogue 800, a user can share their solutions (e.g., Implementation Controls) to specific regulations, standards and/or guidelines. Additionally, the user can easily reuse other users' Implementation Controls and/or Assessor Controls to ensure that their assets satisfy specific regulations, standards and/or guidelines. This allows a user to maintain compliance as regulations, standards and/or guidelines change. This also allows a user to complete the C&A process (or other risk mitigation, protection, best practice or regulatory compliance process) without specific expert knowledge of the regulations, standards and/or guidelines.

Figure 9:
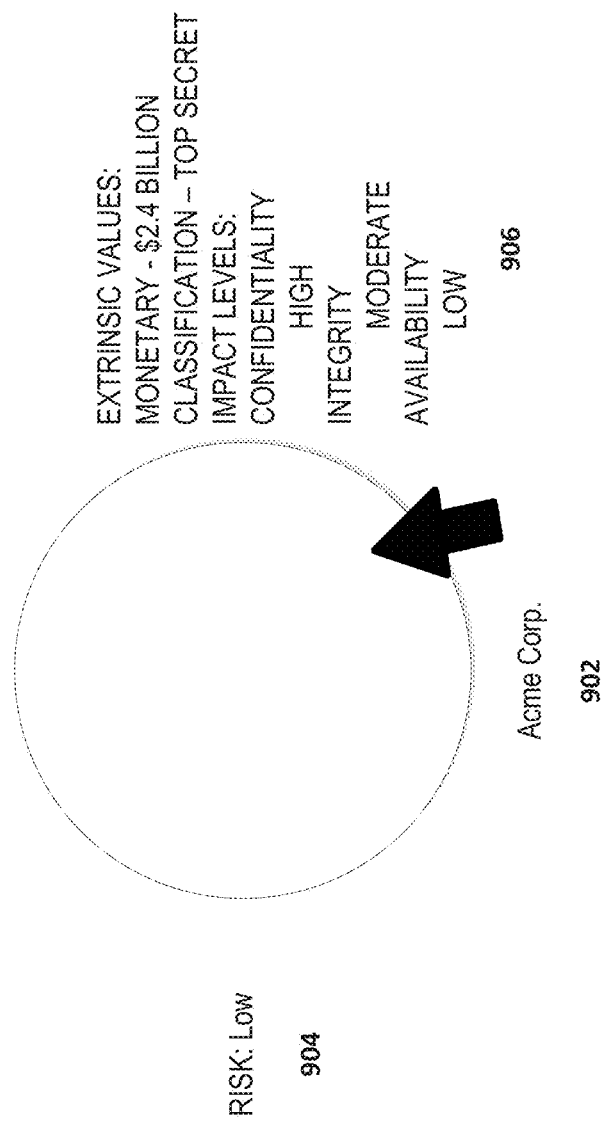
FIG. 9 is a schematic illustration of a security system interface, according to an embodiment.
Figure 10:
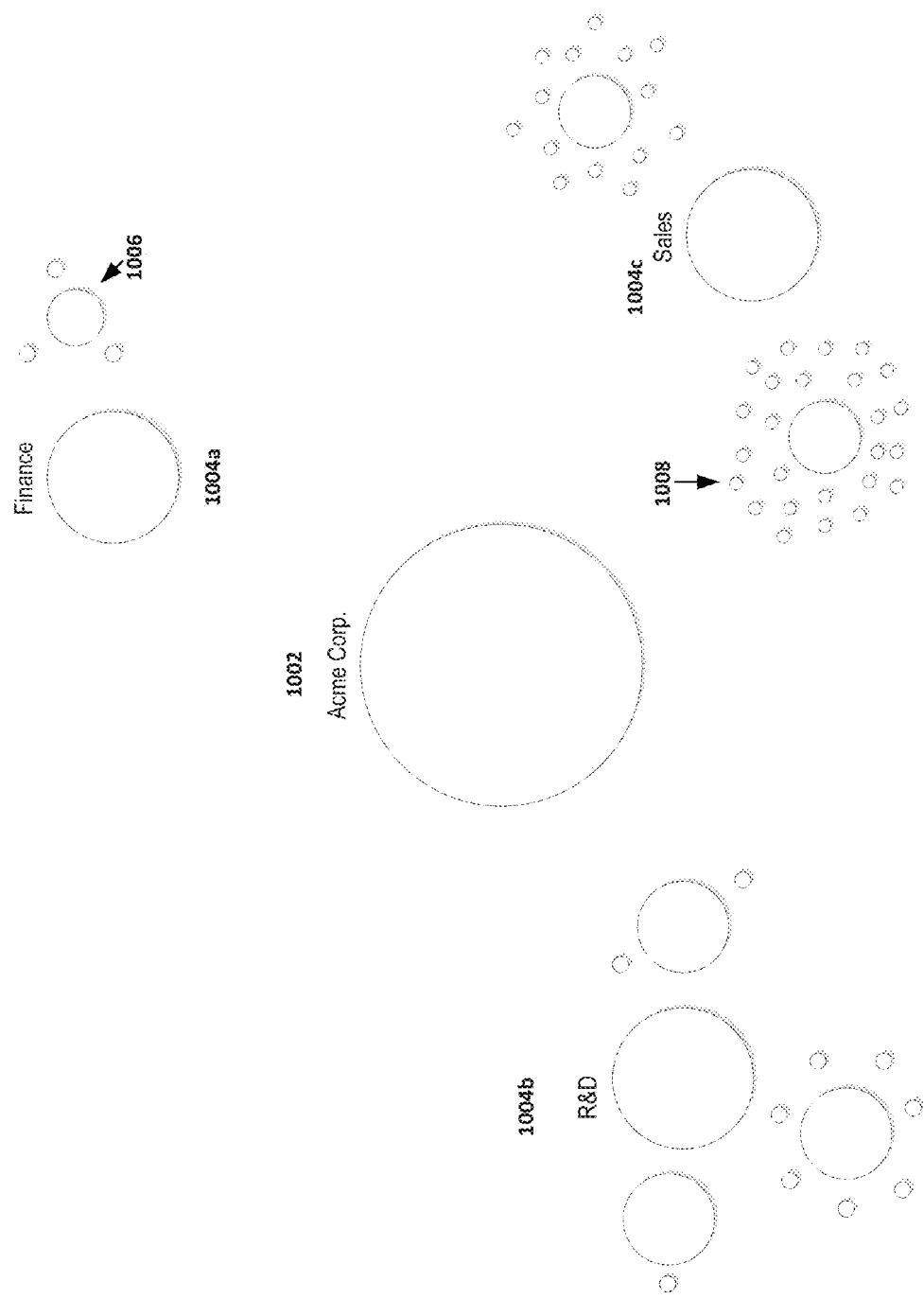
FIG. 10 is a schematic illustration of a security system interface, according to an embodiment.

FIGS. 9-10 are each a schematic illustration of a security system interface, according to an embodiment. In some implementations assets can be displayed in a hierarchically-dependent format in a graphical user interface (GUI), with assets higher in the hierarchy being more prominent in the GUI than assets lower in the hierarchy. For example, an entity (e.g., an organization and/or the like) can be represented on the interface as a prominent asset via an asset representation (e.g., a sun and/or large star icon, and/or a similar icon) 902. In some implementations the prominent asset can also be a main physical asset for the entity, an information system, and/or the like. By hovering over the sun icon, the user can view the Risk Score 904 for the asset, as well as other attributes 906 for the asset (e.g., its monetary value, its classification, its impact levels, and/or the like). For example, when a user hovers her mouse over a representation of the asset (e.g., the asset icon), the GUI can receive a notification of this action, and attribute data associated with the asset (e.g., a health evaluation score and/or risk score, the monetary value of the asset, and/or the like) can be requested, e.g., by requesting the data from the asset database of the control system (e.g., control system 110 of FIG. 1). The control system can then provide the asset-specific attribute data to the GUI for display, such that the user can view the asset information. By receiving an indication that a user has selected the sun icon, the control system can retrieve (e.g., by requesting the data from the asset database in the control system) an asset hierarchy map and/or data associated with the asset, in order to determine if the asset possesses any sub-assets (e.g., if an organization has department sub-assets or property sub-assets, and/or the like). The GUI can display any sub-assets in the asset hierarchy (e.g., as icons and/or like representations in an orbit surrounding the representation of the asset to which they are associated). The user can then view details about those sub-assets. For example, sub-assets can be displayed as icons surrounding the asset from which they are derived (e.g., assets on a lower level of the asset hierarchy can be shown to be orbiting around the asset icon, and/or the like). The control system can, for each sub-asset, retrieve attribute data for the sub-asset (e.g., by requesting the data from the asset database of the control system 110). The GUI can then display and/or otherwise provide to the user, the received sub-asset attribute data as, for example, a representation of the attribute data (e.g., a text block and/or like representation) in proximity to the representation of the asset. Accordingly, assets can be nested within a hierarchy with other assets.

Referring to FIG. 10, in some implementations selecting the main asset, organization, and/or the like 1002 can initiate a different interface in which the main asset can be surrounded sub-assets (e.g., assets on a lower level of the asset hierarchy, including but not limited to machine assets such as server or computer assets, personnel assets such as employees, electronic assets such as document assets, and/or the like), sub-categories of the main asset 1004*a-c* (e.g., departments in the organization asset), and/or the like. Each sub category can have its own sub-categories of assets 1006 (e.g., information systems specific to each department in an organization, and/or the like), which can have further categories of assets 1008 (e.g., data assets within each information system, and/or the like). Selecting one of the assets 1008, as with asset 1002, assets 1004*a-c*, or asset 1006, can show more assets within the next hierarchical level of the asset hierarchy for that asset. In some implementations, sub-categories and/or sub-assets 1004*a-c* can be displayed as smaller planets (e.g., orbiting or surrounding the larger asset 1002), while sub-categories and/or sub-assets 1006 can be displayed as moons orbiting the smaller planets, and sub-categories and/or sub-assets 1008 can be displayed as small stars, comets, and/or like smaller celestial objects hovering around the moons. Further sub-categories and/or sub-assets can be displayed as increasingly smaller entities, as the hierarchical level of the asset and/or category decreases. The user can also be able to hover over the objects to obtain more information about the asset and its Controls' health and/or Risk Score. By selecting assets, the user can also initiate modifications to the Controls associated with an asset, and/or otherwise modify the asset and/or information associated with the asset.

Embodiments and systems described herein allow for an automated and simplified risk mitigation, protection, best practice or regulatory compliance process (e.g., C&A process). For example, identifying user assets, recommending Guideline Controls applicable to such assets, and allowing a user to apply Guideline Controls to such assets (e.g., using the process shown and described with respect to FIGS. 5A and 6A) allows a user to easily understand what guidelines and/or regulations need to be met by such assets. Additionally, Control Chains allow a user to easily link an applicable Implementation Control and Assessor Control to the asset and the Guideline Controls associated with that asset. The Implementation Control allows the guideline, regulation and/or standard to be easily satisfied. The Assessor Control allows the user to, in near real-time, know that the guideline and/or regulation is being satisfied by the Implementation Control. Accordingly, if a Guideline Control is updated (e.g., with an updated guideline and/or regulation), the Assessor Control can notify the user if the Implementation Control is outdated and no longer satisfies the Guideline Control.

Additionally, because the Guideline Controls, the Assessor Controls and the Implementation Controls are modular, they can be reused in multiple different Control Chains. Thus, the user can easily reuse Controls to satisfy and/or assess different guidelines, standards and/or regulations. This allows a user to easily complete the C&A process (or other risk mitigation, protection, best practice or regulatory compliance process). This also allows a user to be confident that their assets meet the requirements of applicable guidelines, regulations and/or standards.

While shown and described above as being used to automate and/or simplify a C&A process, in other embodiments the control system can be used to automate and/or simplify any process that involves the planning and/or protection of assets through risk mitigation, best practice application and/or regulatory compliance in any suitable industry such as, for example, medical, financial, critical infrastructures, cybersecurity, insurance, private industry and/or the like. Specifically, the control system (e.g., control system 110) can be used to implement any suitable guideline (e.g., standard, policy, regulation, etc.) and ensure that the guideline is satisfied by an asset to which the implementation is applied. For example, a the control system described herein can aid in implementation of a company best practice policy. In such an example, a control chain can be defined that includes a guidelines control that outlines the requirements to satisfy the company policy, an implementation to be applied to the asset such that the asset complies with the company policy, and a control assessor configured to monitor the asset for compliance with the company policy.

It is intended that the systems and methods described herein can be performed by software (stored in memory and/or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Unix utilities, C, C++, Java™, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

What is claimed is:

1. An apparatus, comprising:
a memory; and
a control chain processor operatively coupled to the memory, the control chain processor configured to automatically discover a hardware asset in response to the hardware asset being operatively coupled to the control chain processor via a network, the control chain processor configured to automatically identify, in response to automatically discovering the hardware asset, a first plurality of hardware asset attributes for the hardware asset and automatically define, based on the first plurality of hardware asset attributes, an asset data structure for the hardware asset, the control chain processor configured to select, from a control database and in response to automatically discovering the hardware asset, a security guideline control data structure to be implemented with respect to the hardware asset, the security guideline control data structure (1) including requirements to satisfy a human-readable security guideline associated with the security guideline control data structure, (2) being generated during runtime operation by translating the human-readable security guideline into the security guideline control data structure and (3) including a second plurality of hardware asset attributes, the control chain processor configured to select the security guideline control data structure based on the first plurality of hardware asset attributes being associated with the second plurality of hardware asset attributes, the control chain processor configured to select, based on the security guideline control data structure and the first plurality of hardware asset attributes, a security implementation control data structure from a plurality of implementation control data structures and to be associated with the hardware asset, the security implementation control data structure including instructions to interpret information encoded in the security guideline control data structure during runtime operation so as to perform security actions at the hardware asset, the control chain processor configured to select, based on the security implementation control data structure and the security guideline control data structure, a computer-implemented control assessor including computer-readable instructions to execute a computer-implemented automated test to monitor the hardware asset during runtime operation based on the security implementation control data structure to determine compliance of the hardware asset with the security guideline control data structure, the control chain processor configured to define a control chain including the security guideline control data structure, the security implementation control data structure, and the computer-implemented control assessor, the control chain processor configured to send an instruction to apply the control chain to the hardware asset such that the security implementation control data structure is implemented at the hardware asset to improve a security function of the hardware asset and the computer-implemented control assessor monitors the hardware asset based on the security implementation control data structure for compliance with the security guideline.

2. The apparatus of claim 1, wherein the control chain includes Plan of Action and Milestone (POAM) instructions, the control chain processor configured to:
alter, based on the POAM instructions, a health evaluation score action performed by the computer-implemented control assessor for the security implementation control data structure in the control chain.

3. The apparatus of claim 1, wherein the control chain processor is configured to:
store the control chain in an aggregated control catalogue;
receive a request, from a private control catalogue including user-specific control chains, to receive a copy of the control chain; and
provide a representation of the copy of the control chain to the private control catalogue.

4. The apparatus of claim 1, wherein the control chain processor is configured to:

select the computer-implemented control assessor to monitor the hardware asset for compliance with the security guideline control data structure including performing a health evaluation score calculation for the security implementation control data structure, and
modify the security implementation control data structure when a health evaluation score value from the health evaluation score calculation does not meet a predetermined health evaluation criterion.

5. The apparatus of claim 1, wherein the security implementation control data structure is a first security implementation control data structure from the plurality of implementation control data structures, the control chain processor configured to:
select the computer-implemented control assessor to monitor the hardware asset for compliance with the security guideline control data structure including performing a health evaluation score calculation for the first security implementation control data structure, and
select at least a second security implementation control data structure from the plurality of implementation control data structures and to include in the control chain when a health evaluation score value from the health evaluation score calculation does not meet a predetermined health evaluation score criterion.

6. The apparatus of claim 1, wherein the control chain processor is configured to:
select the computer-implemented control assessor to monitor the hardware asset for compliance with the security guideline control data structure including performing a first health evaluation score calculation for the security implementation control data structure at a first time, and
schedule a second health evaluation score calculation for the security implementation control data structure at a second time when a health evaluation score value from the first health evaluation score calculation meets a predetermined health evaluation score criterion.

7. A non-transitory processor-readable medium storing code representing instructions to be executed by a processor, the code comprising code to cause the processor to:
automatically discover a hardware asset in response to the hardware asset being operatively coupled to a control chain processor via a network;
automatically identify, in response to automatically discovering the hardware asset, a first plurality of hardware asset attributes for the hardware asset and automatically define, based on the first plurality of hardware asset attributes, an asset data structure for the hardware asset;
select, from a control database and in response to automatically discovering the hardware asset, a security guideline control data structure to be implemented with respect to the hardware an asset, the security guideline control data structure including requirements to satisfy a human-readable security guideline associated with the security guideline control data structure and being generated by translating the human-readable security guideline into the security guideline control data structure, the security guideline control data structure including a second plurality of hardware asset attributes, the selecting the security guideline control data structure being based on the first plurality of hardware asset attributes being associated with the second plurality of hardware asset attributes;
select, based on the security guideline control data structure and the first plurality of hardware asset attributes, a security implementation control data structure from a plurality of implementation control data structures and to be associated with the hardware asset, the security implementation control data structure including instructions to interpret information encoded in the security guideline control data structure during runtime operation so as to perform security actions at the hardware asset;

select, based on the security implementation control data structure and the security guideline control data structure, a computer-implemented control assessor including computer-readable instructions to execute a computer-implemented automated test to monitor the hardware asset during runtime operation based on the security implementation control data structure to determine compliance of the asset with the security guideline control data structure;

define a control chain including the security guideline control data structure, the security implementation control data structure, and the computer-implemented control assessor; and send an instruction to apply the control chain to the hardware asset such that the security implementation control data structure is implemented with respect to the hardware asset and the computer-implemented control assessor monitors the hardware asset based on the security implementation control data structure for compliance with the security guideline control data structure.

8. The non-transitory processor-readable medium of claim 7, wherein the control chain includes Plan of Action and Milestone (POAM) instructions, the code further comprising code to cause the processor to:

alter, based on the POAM instructions, a health evaluation score action performed by the computer-implemented control assessor for the security implementation control data structure in the control chain.

9. The non-transitory processor-readable medium of claim 7, wherein the control chain includes Plan of Action and Milestone (POAM) instructions, the code further comprising code to cause the processor to:

disable, based on the POAM instructions, a scheduled health evaluation score calculation for the security implementation control data structure.

10. The non-transitory processor-readable medium of claim 7, wherein the control chain includes Plan of Action and Milestone (POAM) instructions, the code further comprising code to cause the processor to:

disable, based on the POAM instructions, a scheduled health evaluation score modification by the computer-implemented control assessor, the scheduled health evaluation score modification is a modification of the control chain by the computer-implemented control assessor when a health evaluation score does not meet a pre-determined criterion.

11. The non-transitory processor-readable medium of claim 7, the code further comprising code to cause the processor to:

store the control chain in an aggregated control catalogue;

receive a request, from a private control catalogue including user-specific control chains, to receive a copy of the control chain; and provide a representation of the copy of the control chain to the private control catalogue.

12. The non-transitory processor-readable medium of claim 7, wherein the security implementation control data structure is a first security implementation control data structure from the plurality of implementation control data structures, the code further comprising code to cause the processor to:

receive an indication of a modification of the requirements to satisfy the human-readable security guideline associated with the security guideline control data structure;

select, based on the indication of the modification, a second security implementation control data structure from the plurality of implementation control data structures and to be associated with the hardware asset; and modify the control chain to include the second security implementation control data structure.

13. The non-transitory processor-readable medium of claim 7, wherein the security implementation control data structure is a first security implementation control data structure from the plurality of implementation control data structures, the code further comprising code to cause the processor to:

receive an indication of a modification of the requirements to satisfy the human-readable security guideline associated with the security guideline control data structure;

select, based on the indication of the modification, at least a second security implementation control data structure from the plurality of implementation control data structures and to be associated with the hardware asset; and modify the control chain to include the second security implementation control data structure but not the first security implementation control data structure.

14. The non-transitory processor-readable medium of claim 7, wherein the computer-implemented control assessor is configured to monitor the compliance of the hardware asset with the security guideline control data structure by performing a health evaluation score calculation for the security implementation control data structure, the code further comprising code to cause the processor to:

perform, using the computer-implemented control assessor, a control chain modification action in response to the health evaluation score calculation.

15. The non-transitory processor-readable medium of claim 7, wherein the computer-implemented control assessor is configured to monitor the compliance of the hardware asset with the security guideline control data structure by performing a health evaluation score calculation for the security implementation control data structure, the code further comprising code to cause the processor to:

modify the security implementation control data structure when a health evaluation score value from the health evaluation score calculation does not meet a predetermined health evaluation score criterion.

16. The non-transitory processor-readable medium of claim 7, wherein the security implementation control data structure is a first security implementation control data structure from the plurality of implementation control data structures, the computer-implemented control assessor is configured to monitor the compliance of the hardware asset with the security guideline control data structure by performing a health evaluation score calculation for the first security implementation control data structure, the code further comprising code to cause the processor to:

select at least a second security implementation control data structure to include in the control chain when a health evaluation score value from the health evaluation score calculation does not meet a predetermined health evaluation score criterion.

17. The non-transitory processor-readable medium of claim 7, wherein the computer-implemented control assessor is configured to monitor the compliance of the hardware asset with the security guideline control data structure by performing a first health evaluation score calculation for the security implementation control data structure at a first time, the code further comprising code to cause the processor to:
schedule a second health evaluation score calculation for the security implementation control data structure at a second time when a health evaluation score value from the first health evaluation score calculation meets a predetermined health evaluation score criterion.

18. The non-transitory processor-readable medium of claim 7, wherein the security implementation control data structure is a first security implementation control data structure from the plurality of implementation control data structures and the computer-implemented control assessor is a first computer-implemented control assessor, the code further comprising code to cause the processor to:
select, based on the security guideline control data structure and the first plurality of hardware asset attributes, a second security implementation control data structure from the plurality of implementation control data structures and to be associated with the hardware asset;
select, based on the second security implementation control data structure, a second computer-implemented control assessor; and
define a modified control chain including the guideline control data structure, the first security implementation control data structure, the second security implementation control data structure, the first computer-implemented control assessor, and the second computer-implemented control assessor.

19. The non-transitory processor-readable medium of claim 7, wherein the security implementation control data structure is selected in part based on a comparison of control attributes in the security guideline control data structure, and control attributes in the security implementation control data structure,
the computer-implemented control assessor is selected in part based on a comparison of the control attributes in the security implementation control data structure, and control attributes in the computer-implemented control assessor.

20. The non-transitory processor-readable medium of claim 7, the code further comprising code to cause the processor to:
receive a request from a user to receive a control chain report;
retrieve control chain attribute data from a database in response to the request;
generate the control chain report based on the control chain attribute data; and
provide a representation of the control chain report to the user,
the control chain attribute data includes at least one of a control chain performance indicator; a control chain health evaluation score; a control chain asset mapping; asset attributes associated with an asset in the control chain asset mapping; or control attributes associated with each of the security guideline control data structure, the security implementation control data structure, and the computer-implemented control assessor.

21. The apparatus of claim 1, wherein the computer-implemented control assessor monitors the compliance of the hardware asset with the security guideline control data structure by monitoring the security actions of the security implementation control data structure, and
the computer-implemented control assessor includes instructions to automatically change settings associated with the security implementation control data structure based on monitoring the compliance of the hardware asset.

22. The apparatus of claim 1, wherein the control chain processor is configured to use a selected communication protocol to communicate with the control chain at the hardware asset to obtain status information associated with the hardware asset.

23. The apparatus of claim 1, wherein the security implementation control data structure is implemented at the hardware asset to place the hardware asset in compliance with the human-readable security guideline.

24. The apparatus of claim 1, wherein the computer-implemented automated test monitors the security implementation control data structure to determine that execution of the security implementation control data structure by the hardware asset places the hardware asset in compliance with the security guideline control data structure.

* * * * *

UNITED STATES PATENT AND TRADEMARK OFFICE
CERTIFICATE OF CORRECTION

PATENT NO. : 9,817,978 B2
APPLICATION NO. : 14/511866
DATED : November 14, 2017
INVENTOR(S) : Jacob J. Marsh et al.

It is certified that error appears in the above-identified patent and that said Letters Patent is hereby corrected as shown below:

In the Claims

Column 30, Line 54 (Claim 7, Line 16):
"respect to the hardware an asset, the security guideline" should be -- respect to the hardware asset, the security guideline --

Signed and Sealed this
Thirteenth Day of February, 2018

Andrei Iancu
*Director of the United States Patent and Trademark Office*